(12) United States Patent
Barros

(10) Patent No.: US 10,560,541 B2
(45) Date of Patent: Feb. 11, 2020

(54) SERVICE DELIVERY MANAGEMENT FOR BROKERED SERVICE DELIVERY

(75) Inventor: Alistair P. Barros, Camira (AU)

(73) Assignee: SAP SE, Walldorf (DE)

( * ) Notice: Subject to any disclaimer, the term of this patent is extended or adjusted under 35 U.S.C. 154(b) by 938 days.

(21) Appl. No.: 12/788,084

(22) Filed: May 26, 2010

(65) Prior Publication Data

US 2011/0295645 A1 Dec. 1, 2011

(51) Int. Cl.
*H04L 29/08* (2006.01)
*G06Q 10/06* (2012.01)

(52) U.S. Cl.
CPC ... *H04L 67/2838* (2013.01); *G06Q 10/06316* (2013.01)

(58) Field of Classification Search
CPC .................. H04L 67/2838; G06Q 10/06316
USPC .................. 705/7.11, 7.12, 7.26; 709/227
See application file for complete search history.

(56) References Cited

U.S. PATENT DOCUMENTS

| | | | |
|---|---|---|---|
| 6,499,042 B1* | 12/2002 | Markus .................. | 715/217 |
| 7,050,987 B2 | 5/2006 | Lettovsky et al. | |
| 7,107,333 B2* | 9/2006 | Burbeck et al. ............ | 709/223 |
| 7,213,070 B2* | 5/2007 | Chalon .......................... | 709/226 |
| 7,286,545 B1* | 10/2007 | Tester et al. ................... | 370/401 |
| 7,333,943 B1* | 2/2008 | Charuk et al. ................ | 705/26.1 |
| 7,739,389 B2* | 6/2010 | Creamer et al. ............. | 709/227 |
| 7,886,048 B1* | 2/2011 | Holland et al. .............. | 709/224 |
| 7,917,124 B2* | 3/2011 | D'Angelo et al. ........... | 455/411 |
| 2002/0196741 A1* | 12/2002 | Jaramillo et al. ............ | 370/252 |
| 2003/0031164 A1* | 2/2003 | Nabkel et al. ................. | 370/352 |
| 2003/0074302 A1* | 4/2003 | Cope ........................ | G06Q 10/06 705/37 |
| 2003/0101116 A1* | 5/2003 | Rosko et al. ................... | 705/35 |

(Continued)

FOREIGN PATENT DOCUMENTS

CN 1849621 A 10/2006

OTHER PUBLICATIONS

Managing process and service fusion in virtual enterprises by Dimitrios Georgakopoulos, Hans Schuster, Andrzej Cichocki, and Donald Baker, Information Systems vol. 26, No. 6, pp. 429-456, 1999, Elsevier Science Ltd. (Year: 1999).*

(Continued)

*Primary Examiner* — Timothy Padot
*Assistant Examiner* — Darlene Garcia-Guerra
(74) *Attorney, Agent, or Firm* — Mintz Levin Cohn Ferris Glovsky and Popeo, P.C.

(57) ABSTRACT

A broker consumer gateway may interface with a service consumer of a computing device consuming at least one service of at least one service provider, including receiving requests for forms, providing the forms, and receiving submitted forms. A service delivery manager may deliver the at least one service. The service delivery manager may include a consumer session manager that creates at least one consumer session to execute at least a portion of the at least one service, a consumer instance manager that creates at least one instance of the at least one service, and a service coordinator configured to coordinate the delivery of the at least one service, based on a coordination model characterizing the at least one service in which the forms are associated with service states of the at least one service and in which transitions between the service states are executed based on the submitted forms.

20 Claims, 26 Drawing Sheets

(56) References Cited

U.S. PATENT DOCUMENTS

| | | | |
|---|---|---|---|
| 2003/0145103 A1* | 7/2003 | Pruyne et al. | 709/237 |
| 2003/0229900 A1* | 12/2003 | Reisman | 725/87 |
| 2004/0220878 A1* | 11/2004 | Lao et al. | 705/51 |
| 2004/0230536 A1* | 11/2004 | Fung et al. | 705/64 |
| 2006/0022048 A1* | 2/2006 | Johnson | 235/462.1 |
| 2007/0150322 A1* | 6/2007 | Falchuk et al. | 705/7 |
| 2007/0174815 A1* | 7/2007 | Chrysanthakopoulos et al. | 717/120 |
| 2007/0208590 A1* | 9/2007 | Dorricott et al. | 705/1 |
| 2008/0275935 A1* | 11/2008 | Mohindra et al. | 709/201 |
| 2009/0024514 A1* | 1/2009 | Kumaran et al. | 705/37 |
| 2009/0138317 A1* | 5/2009 | Schoenberg | 705/9 |
| 2009/0191679 A1* | 7/2009 | Ouyang et al. | 438/216 |
| 2009/0265774 A1* | 10/2009 | Malik et al. | 726/7 |
| 2009/0327454 A1* | 12/2009 | Iwasaki | 709/219 |
| 2010/0228815 A1* | 9/2010 | Stokking | H04M 7/0024 709/203 |
| 2010/0281166 A1* | 11/2010 | Buyya et al. | 709/226 |
| 2011/0295646 A1 | 12/2011 | Barros et al. | |

OTHER PUBLICATIONS

BPMI Org., "Business Process Modeling Notation (BPMN) Specification 1.0", Final Adopted Specification, Technical report, OMG, Feb. 1, 2006, 308 pages.

Baeten et al., "Process Algebra", Cambridge University Press, New York, NY, USA, 1991, 17 pages.

Christensen et al., "Design/CPN Overview of CPN ML Syntax", Version 3.0, University of Aarhus, 1996, 15 pages.

Dijkman et al.,"Formal Semantics and Automated Analysis of BPMN Process Models", QUT ePrints, ID Code—5969, Jan. 2007, 25 pages.

Decker et al., "Formalizing Service Interactions", Proceedings of the 4th International Conference on Business Process Management (BPM 2006), vol. 4102 of LNCS, 2006, 16 pages.

Desel et al., "Place/transition Petri nets", Lectures on Petri Nets I: Basic Models, Lecture Notes in Computer Science, vol. 1491, 1998, pp. 122-173.

White, S., "Using BPMN to Model a BPEL Process", BPTrends, vol. 3, No. 3, Mar. 2005, 18 pages.

Jensen, K., "Coloured Petri Nets", Basic Concepts, Analysis Methods and Practical Use, vol. 1, Springer, 1996, 100 pages.

Jensen, K., "Coloured Petri Nets", Basic Concepts, Analysis Methods and Practical Use, vol. 2, Analysis Methods, Monographs in Theoretical Computer Science, Springer-Verlag, 1997, 100 pages.

Kiepuszewski et al., "Fundamentals of control flow in workflows", QUT Technical report, FIT-TR-2002-03, 2002, 62 pages.

Meyer, B., "Introduction to the theory of programming languages", Prentice-Hall, Inc., 1990, 5 pages.

Milner et al., "Communicating and Mobile Systems: the [Pi]-Calculus", Cambridge University Press, 1999, 10 pages.

Mendling et al., "Towards Workflow Pattern Support of Event-Driven Process Chains (EPC)", Proceedings of the 2nd Workshop XML4BPM, 2005, 15 pages.

Milner et al., "A Calculus of Mobile Processes, I", Information and Computation, vol. 100, No. 1, 1992, pp. 1-40.

Ouyang et al., "Translating Standard Process Models to BPEL", BPM Center Report, BPM-05-27, BPMcenter Org, 2005, 17 pages.

Ouyang et al., "From BPMN Process Models to BPEL Web Services", Proceedings of the IEEE International Conference on Web Services (ICWS'06), Sep. 2006, pp. 285-292.

Ouyang et al., "Formal Semantics and Analysis of Control Flow in WS-BPEL", BPM Center Report, BPM-05-13, BPMcenter. org, 2005, 34 pages.

Ouyang et al., "From Business Process Models to Process-oriented Software Systems: The BPMN to BPEL Way", QUT eprint, ID-5969, 2006, 37 pages.

Ouyang et al., "Translating BPMN to BPEL", BPM Center Report BPM-06-02, BPMcenter. org, 2006, 22 pages.

Petri, Carl A., "Communication with Automata", Technical Report No. RADC-TR-65-377, vol. 1, Supplement 1, Jan. 1966, 97 pages.

Phifer et al., "Technologies That Enable Business Process Fusion", Gartner, Inc., Research, ID No. AV-20/9898, Oct. 16, 2003, 4 pages.

Puhlmann et al., "Using the Pi-calculus for Formalizing Workflow Patterns", 3rd International Conference on Business Process Management, vol. 3649, 2005, pp. 153-168.

Wohed et al., "Pattern Based Analysis of BPEL4WS", Department of Computer and Systems Sciences, Stockholm University/The Royal Institute of Technology, Sweden, 2003, 20 pages.

Recker et al., "Do Process Modelling Techniques Get Better? A Comparative Ontological Analysis of BPMN", 16th Australasian Conference on Information Systems, Nov. 29-Dec. 2, 2005, 10 pages.

Recker et al., "On the Translation between BPMN and BPEL: Conceptual Mismatch between Process Modeling Languages", Technical Report, QUT ePrints, ID Code—4637, Jul. 2006, 12 pages.

Russell et al., "Workflow Data Patterns", Proceedings of 24th International Conference on Conceptual Modeling (ER05), vol. 3716, 2005, pp. 1-75.

Russell, et al., "Workflow Control-Flow Patterns: A Revised View", Workflow Patterns Initiative, BPM Center Report BPM-06-22, 2007, 134 pages.

Russell et al., "Workflow Resource Patterns: Identification, Representation and Tool Support", Proceedings of the 17th Conference on Advanced Information Systems Engineering (CAiSE'05), vol. 3520 of LNCS, 2005, 16 pages.

Wohed et al., "On the Suitability of BPMN for Business Process Modelling", Proceedings 4th International Conference on Business Process Management (BPM 2006), LNCS, 2006, 17 pages.

Wohed et al., "Pattern-based Analysis of UML Activity Diagrams", Beta, Research School for Operations Management and Logistics, 2004, 22 pages.

Hofstede, et al., "How to formalize it? Formalization Principles for Information System Development Methods", Information and Software Technology, vol. 40, No. 10, 1998, pp. 1-33.

Van der Aalst, et al., "Patterns and XPDL: A Critical Evaluation of the XML Process Definition Language", Technical report, Technical Report FIT-TR-2003-06, Queensland University of Technology, Brisbane, 2003, 30 pages.

Van der Aalst, et al., "Advanced Workflow Patterns", Proceedings of the 7th International Conference on Cooperative Information Systems, 2000, pp. 18-29.

Van der Aalst, et al., "Pattern-Based Analysis of BPML (and WSCI)", Queensland University of Technology, Brisbane: QUT Technical Report FIT-TR-2002-05, 2002, 27 pages.

Van der Aalst, et al., "Workflow Patterns", Distributed and Parallel Databases, vol. 14, No. 1, 2003, 70 pages.

Dongen et al., "The ProM Framework: A New Era in Process Mining Tool Support", Application and Theory of Petri Nets, vol. 3536, 2005, 10 pages.

Wynn et al., "Achieving a General, Formal and Decidable Approach to the OR-join in Workflow using Reset nets", Applications and Theory of Petri Nets, vol. 3536, 2005, pp. 423-443.

White, S., "Process Modeling Notations and Workflow Patterns", BPTrends, Workflow Handbook, Mar. 2004, pp. 1-24.

Wynn et al., "Synchronisation and Cancellation in Workflows based on Reset nets", BPM Center Report BPM-06-26, BPMcenter, Jun. 2006, pp. 1-38.

Wohed et al., "Pattern-based Analysis of BPMN—An Extensive Evaluation of the Control-Flow, the Data and the Resource Perspectives", BPM Center Report BPM-05-26, BPMcenter. org, 2005, 23 pages.

Alves, et al "Web Services Business Process Execution Language Version 2.0", OASIS Standard, Apr. 11, 2007, 264 pages.

Alves, et al "Web Services Business Process Execution Language Version 2.0", Public Review Draft, Aug. 23, 2006, 276 pages.

Non-Final Office Action for U.S. Appl. No. 12/788,087, dated Feb. 6, 2012, 27 pages.

Final Office Action for U.S. Appl. No. 12/788,087, dated Aug. 29, 2012, 40 pages.

Final Office Action Response for U.S. Appl. No. 12/788,087, filed Jan. 10, 2013, 8 pages.

(56) References Cited

OTHER PUBLICATIONS

Advisory Action for U.S. Appl. No. 12/788,087, dated Feb. 13, 2013, 3 pages.
Non Final Office Action issued for U.S. Appl. No. 12/788,087, dated May 2, 2014, 39 pages.

* cited by examiner

200

202
Interface with a service consumer of a computing device consuming at least one service of at least one service provider to thereby execute a delivery of the service to the service consumer, including receiving requests for forms, providing the forms, and receiving submitted forms

204
Create at least one consumer session during which to execute at least a portion of the at least one service

206
Create at least one instance of the at least one service within the at least one consumer session, the at least one instance being associated with a user of the at least one service

208
Coordinate the delivery of the at least one service from the at least one service provider and within the consumer session and the consumer instance, based on a coordination model characterizing the at least one service in which the forms are associated with service states of the at least one service and in which transitions between the service states are executed based on the submitted forms

| Broker Consumer Gateway |
|---|
| |
| authenticateUser(ConsumerSession : String, UserId: String, OperatorId: String, RequestDetails : ConsumerRequestMsg)<br>processRequest(ConsumerSession : String, UserId: String, OperatorId: String, RequestDetails: ConsumerRequestMsg)<br>formGet(ConsumerSessionid : String RequestDetail: ConsumerRequestMsg)<br>fromSubmit(ConsumerSessionId: String, RequestDetails: ConsumerRequestMsg)<br>createConsumerSession(UserId : String, OperatorId : String, RequestDetails: ConsumerRequestMsg)<br>deleteConsumerSession(ConsumerSessionId: String, RequestDetails: ConsumerRequestMsg)<br>getConsumerSession(UserId : String, OperatorId:String, RequestDetails: ConsumerRequestMsg)<br>createServiceGroup(UserId:String,OperatorId : String, RequestDetails ; ConsumerRequestMsg)<br>deleteServiceGroup(ConsumerSessionId: String,RequestDetails:ConsumerRequestMsg)<br>getServiceGroups(ConsumerSessionId: String, RequestDetails: ConsumerRequestMsg)<br>getAllServiceGroup(ConsumerSessionId: String, UserId: String, RequestDetails: ConsumerRequestMsg)<br>getAllServiceGroups(Consumer sessionId: String, UserId: String, OperatorId: String, requestDetails:ConsumerRequestMsg)<br>createService(ConsumerSessionId:String,Request Details;ConsumerRequestMsg)<br>deleteService(consumerSessionId:String,RequestDetails:ConsumerRequestMsg)<br>add ServicetoServiceGroup(ConsumerSessionId:String, Requestdetails: ConsumerRequestMsg)<br>removeServiceFromServiceGroup(ConsumerSessionId: String, RequestDetails: ConsumerRequestMsg)<br>removeAllServicesServiceGroup(In ConsumerSessionId: String, RequestDetails: ConsumerRequestMsg)<br>moveServiceFromServiceGroup(ConsumerSessionId : String, RequestDetails: ConsumerRequestMsg)<br>moveAllServiceFromServiceGroup(ConsumerSessionId : String, RequestDetails: ConsumerRequestMsg)<br>createPayment(ConsumerSession:String,UserId : String, OperatorId : String, PaymentMethod : String, RequestDetail : ConsumerRequesting)<br>getPayment(ConsumerSession : String, UserId : String, OperatorId: String, RequestDetails : ConsumerRequestMsg)<br>setPayment(CreatePayment(ConsumerSession : String, UserId : String, OperatorId : String, PaymentMethod :String, RequestDetails: ConsumerRequestMsg)<br>addServicePaymentGroup(ConsumerSession:String,UserId : String, OperatorId: String, RequestDetails: Consumer RequestMsg)<br>refundPayment(ConsumerSession:String,UserId:String,OperatorId:String, RequestDetails: ConsumerRequestMsg)<br>cancelPayment(ConsumerSession : String, UserId : String, OperatorId, RequestDetails : ConsumerRequestMsg)<br>setPaymentAuthorisation(ConsumerSession : String, UserId : String, OperatorId:String, RequestDetails : ConsumerRequestMsg)<br>performTransactionTotals(ConsumerSession : String, UserId : String, OperatorId: String, RequestDetails : ConsumerRequestMsg) |

FIG. 4

| ConsumerSession |
|---|
| |
| authenticateUser(UserId : String, OperatorId: String, RequestDetails; ConsumerRequestMsg)<br>createServiceGroup(UserId : String, OperatorId : String, RequestDetails : ConsumerRequestMsg)<br>deleteServiceGroup(ConsumerSessionID: String, RequestDetails : ConsumeRequestMsg)<br>assignSrviceGroupToUser(UserId : String, OperatorId: String, ConsumerSessionId; String, RequestDetails:ConsumerRequestMsg)<br>getServiceGroup(ConsumerSessionId: String, UserId: String, RequestDetails : ConsumerRequestMsg)<br>getAllServiceGroups(ConsumerSessionId: String, UserId, RequestDetails: ConsumerRequestMsg)<br>addServicetoServiceGroup (ConsumerSessionId : String, RequestDetails : ConsumerRequestMsg)<br>removeServiceFromServiceGroup (ConsumerSessionId : String, RequestDetails : ConsumerRequestMsg)<br>removeAllServiceinServiceGroup(in ConsumerSessionId : String, RequestDetails : ConsumerRequestMsg)<br>moveServiceFromServiceGroup(ConsumerSessionId: String, RequestDetails : ConsumerRequestMsg)<br>getDefaultServiceGroup(ConsumerSessionId: String, UserId: String, RequestDetails: ConsumerRequestMsg)<br>setDefaultServiceGroup(ConsumerSessionId : String, UserId : String, RequestDetails : ConsumerRequestMsg)<br>createService(ConsumerSessionId: String, RequestDetails: ConsumerRequestMsg)<br>deleteService(ConsumerSessionId: String, RequestDetails: ConsumerRequestMsg)<br>processRequest(RequestDetails:ConsumerRequestMsg)<br>formGet(ConsumerSessionId : String, RequestDetails: ConsumerRequestMsg)<br>formSubmit(ConsumerSessionId : String, RequestDetails: ConsumerRequestMsg)<br>getPayment(in ConsumerSession : String, RequestDetails: ConsumerRequestMsg)<br>setPayment(in ConsumerSession : String, RequestDetails: ConsumerRequestMsg)<br>addServicetoPaymentGroup(inConsumerSession, RequestDetails : ConsumerRequestMsg)<br>refundPayment(in Consumer Session : String, RequestDetails: ConsumerRequestMsg)<br>cancelPayment(in ConsumerSession : String, RequestDetails : ConsumerRequestMsg)<br>SetPaymentAuthorisation(in ConsumerSession : String, RequestDetails: Consumer RequestMsg) |

| PaymentGroup |
|---|
| |
| addService(ConsumerSession : String, UserId : String, OperatorId: String, PaymentMethod : String, RequestDetails: ConsumerRequestMsg)<br>removeService(ConsumerSession : String, UserId : String, OperatorId : String, PaymentMethod : String, Request Details: ConsumerRequestMsg)<br>getPayment(ConsumerSession : String, UserId : String, OperatorId: String, RequestDetails: ConsumerRequestMsg)<br>setPayment(createPayment(ConsumerSession: String, UserId: String, OperatorId: String, PaymentMethod: String, RquestDetails: ConsumerRequestMsg)<br>Refund(ConsumerSession: String, UserId: String, OperatorId: String, Request Details: ConsumerRequestMsg)<br>cancel(ConsumerSession : String, UserId: String, OperatorId: String, RequestDetails: ConsumerRequestMsg)<br>setPaymentAuthorisation(ConsumerSession : String, UserId: String, OperatorId: String, RequestDetails: ConsumerRequestMsg)<br>PerformTransactionTotals(ConsumerSession : String, UserId: String, OperatorId: String, RequestDetails:ConsumerRequestMsg) |

FIG. 14

SERVICE DELIVERY MANAGEMENT FOR BROKERED SERVICE DELIVERY

TECHNICAL FIELD

This description relates to brokered service delivery.

BACKGROUND

The brokering of goods and services is a time-honored technique of facilitating commerce. In its many forms, such brokering shares a recognition that providers of goods and services are often unwilling or unable to undertake the effort needed to initiate, conduct, or consummate a transaction with one or more consumers. For example, a manufacturer of a good may prefer to focus on the manufacturing process, and may therefore contract with a broker, who may then be responsible for locating a purchaser of the manufactured good and for conducting and consummating the sale of the good with the purchaser. Of course, the broker typically receives a share of the purchase price or some other fee or payment for providing these brokering services. In this way, the manufacturer (or other provider) and the broker may concentrate on developing their respective areas of expertise.

In the computer, network, and software realm(s), brokers have adopted these general concepts for the delivery of goods and services, e.g., over the Internet. For example, brokers may provide a marketplace in which various providers may sell their respective goods and/or services. For example, a provider of a 'real-world' item such as a book (e.g., a publisher) may utilize a broker to sell copies of the book. Similarly, brokers may exist which facilitate sales of digital content (e.g., songs or movies) and/or sales of software applications, among many other items for sale.

Meanwhile, however, software has evolved from standalone, integrated, monolithic applications into discrete services which provide specific functionality (or which combine to provide desired functionality), often on an as-needed basis. Conceptually, virtually any software functionality may be provided as a service, e.g., over the Internet or other network. Moreover, different services, perhaps from different sources, may be combined or sold together, e.g., for providing aggregated functionality and/or for providing competitive bundling of services to entice users to make (additional) purchase(s).

In theory, the intersection of brokering and software services, then, is conceptually straight-forward. That is, software service providers (referred to herein as service providers) may be as desirous as any other provider to obtain the advantages of providing their (software) services through a broker. In some cases, such as when software is conceptually similar to discrete goods (as in the example(s) above of digital songs or movies), the implementation of brokering services is also straight-forward. Specifically, for example, a broker may obtain rights to sell the software in question, and may locate a customer for the software and otherwise conduct and consummate the sale.

In practice, however, many services are conventionally difficult or impossible to deliver as part of a brokered service delivery scenario, at least in any standard or widely-applicable manner. For example, there may be a software service provided by a municipality or other governmental entity to potential small business owners for initiating and registering a business license of some kind. These and other similar services may be complex, long-running process(es) which execute over the course of multiple days or longer, and which may be accessed by users over multiple channels (e.g., different user devices). In addition, such multi-step services may execute on back-end (e.g., legacy) applications of the service provider and may require multiple interactions/interfaces with the service provider and/or other stakeholders. Further, when services are combined or associated for delivery to a single user, associated integration or interaction of such services may be complicated by various technical and/or business considerations, particularly when the services to be combined are provided by different service providers (e.g., different enterprises having different back-end legacy systems).

Service delivery of brokered services includes the actual run-time, execution of the brokered services, and possibly related functions (e.g., payment collection). During service delivery, the service broker may act as a simple intermediary that provides a central point of access to the various back-end, executing services hosted by the service providers in question. Such a delivery model generally implies minimal requirements on the service broker, while placing a burden on the service providers to ensure interoperability of their respective services (with one another and with the user). Conversely, services may themselves be directly hosted by a service broker; however, it may be impractical or impossible for the service broker to adapt and execute all of the various services (and combinations thereof) that may be desired by various users. Moreover, such difficulties may be particularly acute when brokering the type of multi-step, multi-provider, long-running, complex services referenced above.

In short, no satisfactory solution exists for delivering brokered services in a practical manner that leverages the relative resources and areas of expertise of the involved parties. Consequently, service providers are less able to commercialize their services, service brokers are less capable of brokering such services, and consumers suffer a more-limited market for, and less access to, services that they may wish to use.

SUMMARY

According to one general aspect, a computer system including instructions stored on a computer-readable storage medium may include a broker consumer gateway configured to cause at least one processor to interface with a service consumer of a computing device consuming at least one service of at least one service provider, including receiving requests for forms, providing the forms, and receiving submitted forms, and a service delivery manager configured to cause the at least one processor to deliver the at least one service. The service delivery manager may include a consumer session manager configured to cause the at least one processor to create at least one consumer session during which to execute at least a portion of the at least one service, a consumer instance manager configured to cause the at least one processor to create at least one instance of the at least one service within the at least one consumer session, the at least one instance being associated with a user of the at least one service, and a service coordinator configured to cause the at least one processor to coordinate the delivery of the at least one service from the at least one service provider within the consumer session and the consumer instance, based on a coordination model characterizing the at least one service in which the forms are associated with service states of the at least one service and in which transitions between the service states are executed based on the submitted forms.

According to another general aspect, a computer-implemented method including executing instructions stored on a computer-readable storage medium may include interfacing with a service consumer of a computing device consuming at least one service of at least one service provider to thereby execute a delivery of the service to the service consumer, including receiving requests for forms, providing the forms, and receiving submitted forms. The method may further include creating at least one consumer session during which to execute at least a portion of the at least one service, creating at least one instance of the at least one service within the at least one consumer session, the at least one instance being associated with a user of the at least one service, and coordinating the delivery of the at least one service from the at least one service provider and within the consumer session and the consumer instance, based on a coordination model characterizing the at least one service in which the forms are associated with service states of the at least one service and in which transitions between the service states are executed based on the submitted forms.

According to another general aspect, a computer program product tangibly embodied on a computer-readable storage medium and may include executable code that, when executed, is configured to cause at least one data processing apparatus to interface with a service consumer of a computing device consuming at least one service of at least one service provider to thereby execute a delivery of the service to the service consumer, including receiving requests for forms, providing the forms, and receiving submitted forms, create at least one consumer session during which to execute at least a portion of the at least one service, create at least one instance of the at least one service within the at least one consumer session, the at least one instance being associated with a user of the at least one service, and coordinate the delivery of the at least one service from the at least one service provider and within the consumer session and the consumer instance, based on a coordination model characterizing the at least one service in which the forms are associated with service states of the at least one service and in which transitions between the service states are executed based on the submitted forms.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example operations of the system of FIG. 1.

FIG. 4 illustrates an example of a broker consumer gateway interface.

FIG. 6 illustrates an example of a consumer session object which may be managed by the consumer session manager of FIG. 5.

FIG. 14 provides a sample payment manager interface, shown as a class diagram.

DETAILED DESCRIPTION

Figure 1:
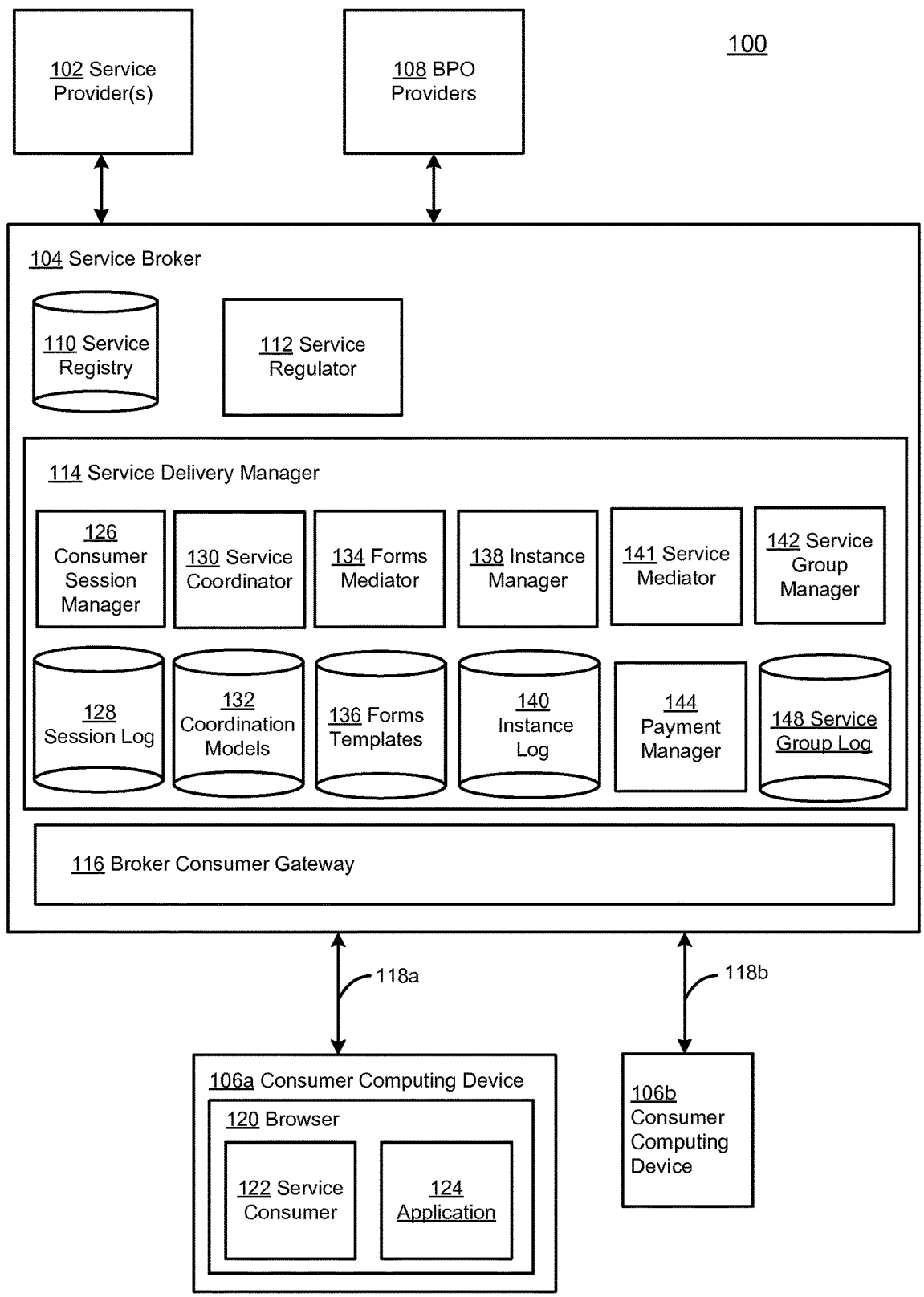
FIG. 1 is a block diagram of a system for providing brokered service delivery.

FIG. 1 is a block diagram of a system 100 for providing service delivery management for brokered service delivery. In the example of FIG. 1, a service provider 102 represents an owner, developer, seller, or other provider of one or more services which the service provider 102 wishes to provide, through a service broker 104, to one or more consumer computing device(s) 106*a*, 106*b*. As described in detail herein, the service broker 104 provides an explicit, dedicated platform for service delivery management which enables complex service delivery models to support the run-time brokerage of groups of long-running, multi-session services, some or all of which may be hosted by different, otherwise-incompatible service providers.

In more detail, the service provider 102 may represent virtually any entity wishing to sell or provide access to the services, including, e.g., commercial software providers, bank/financial corporations, health service providers, legal entities, or municipalities or other governmental entities. The services may represent, e.g., executable code for, for example, stand-alone consumer products, such as may be provided by way of an Internet browser to a purchaser, as described herein. In more specific examples, the services may include, e.g., a small business creation service, a property conveyance service, or a service for ordering passports, to name a few. Alternatively, the services may represent services that operate as foundational or component services that are each to be combined with other services to provide a composite functionality that is exposed to the consumer computing device 106*a*, 106*b*.

In FIG. 1, the service broker 104 may utilize business process outsourcing (BPO) providers 108 to allow for, e.g., outsourcing of non-core operations or other functionality to reduce a total cost-of-ownership of the service broker 104. For example, BPO providers 108 may provide services used by the service broker 104, such as billing/payment services, or, more generically, may provide outsourcing of hardware resources (e.g., memory, processing power) for the service broker 104. Additional examples of BPO providers 108 are described in more detail, below.

In practice, the service provider(s) 102 may register and onboard services within a service registry 110, meaning, e.g., that delivery and execution of the services may take place through the service broker 104. Where the BPO providers 108 provide additional services leveraged by the service broker 104, such services also may be registered and onboarded, where necessary, within the service registry 110.

When registering services in this manner, a service regulator 112 may be used to ensure that service interfaces for the services are exposed in a way that is consistent with a service delivery model(s) of a service delivery manager 114, as described in detail, herein. Generally speaking, such service regulation may include mapping or other transformation of a given service interface into a generic description of states and transitions between the states, where the states are represented as forms (and/or form templates) to be requested, filled-in, and submitted by a user of the consumer computing device(s) 106a, 106b. In this way, as described herein, the service delivery manager 114 may mediate delivery of the service(s) including invoking forms in a specific manner needed at any given point during execution of a lifecycle of the service(s).

In specific examples described herein, the service regulator 112 may use a model of the service interface(s) of the service(s) in question to generate an eXtensible Markup Language (XML) file representing the states (forms) and transitions therebetween, which thereby allows for service delivery in a manner consistent with the underlying service(s), including prevention of deadlocks and/or livelocks of the service(s) in question, even when multiple services are combined, bundled, or otherwise grouped together from disparate service providers.

Once services have been registered in this manner, it becomes possible for the service delivery manager 114 to provide mediated provisioning of the services to the consumer computing devices 106a, 106b. As shown in FIG. 1, a broker consumer gateway (BCG) 116 may be provided by the service delivery manager 114 which may be configured to communicate with the consumer computing devices 106a, 106b via corresponding channels 118a, 118b. In this context, the term channel may include reference to any mode or type of communication, and may be defined by, e.g., a type of the consumer computing device(s) 106a, 106b (e.g., smartphone, desktop computer, laptop computer or netbook, or specific brands/types thereof), or by a nature of an intervening computer network(s), or by software executing on the consumer computing devices 106a, 106b (e.g., a particular operating system), or by a preference(s) of a user(s) of the consumer computing device(s), to name a few examples.

In the example of FIG. 1, a browser 120 is illustrated as being executed by the consumer computing device 106a. A service consumer 122, represents an aspect of, or a component used by, the service delivery manager 114, which facilitates mediation or other delivery of services through the broker consumer gateway 116 so as to enable (enhanced) execution of an application 124. More specifically, the service consumer 122 has knowledge of a specific messaging interface of the broker consumer gateway 116, so that together the service consumer 122 and the broker consumer gateway 116 provide a proxy for underlying services which removes or mitigates a requirement for knowledge thereof by the browser 120, application 124, or other services within the service registry 110. Detailed examples of the broker consumer gateway 116, and of message interfacing between the broker consumer gateway 116 and the service consumer 122, are provided below.

In a specific example, the service provider(s) 102 may include a real estate company and a mortgage/loan provider, which may be separate enterprises, each hosting its own back-end versions of related services which may be provided over the Internet or other network. The real estate company may provide a website advertising its services, and may wish to provide a service of applying for a home loan in conjunction with its existing website. In the system 100 of FIG. 1, the loan service may be provided to a user within the browser 120, e.g., experienced as the application 124 in which the user submits various types of relevant information and receives information about possible home loans in return.

Of course, numerous examples of services related to providing home loans already exist and are provided over the Internet, e.g., directly by the mortgage/loan provider itself, perhaps on its own website. However, the system 100 provides techniques for integrating the home loan service with services provided by the real estate company, and in the context of the service broker 104. The system 100 thus provides the above-referenced platform for explicit support of brokered service delivery, in a manner that is straightforward, consistent, reliable, and takes into account the various ways in which the brokering of services (in particular, long-running, stateful services provided by disparate service providers) differs from the brokering of other goods.

In so doing, the service delivery manager 114 includes a consumer session manager 126 which may be configured to create and maintain a session associated with a user of the consumer computing device 106a. Information about the session may, in some implementations, be stored in a session log 128, so that, e.g., if the user temporarily ends or suspends the session, the user may nonetheless resume consumption of the service(s) in question at a later time. For example, a first session may be persisted to the session log 128, and, at a later time, a second session for the same user may be created and automatically linked to the first session. As described in detail below, the consumer session manager 126 may be used to provide or facilitate an execution environment for particular instances of services and/or for groups of services executing together within the session, as well as for payment and other related brokerage functionality (perhaps provided by the BPO provider(s) 108), in association with the user of, in this example, the consumer computing device 106a.

In providing such an execution environment, a service coordinator 130 may be used to track (and advance) a current state of each service, e.g., of each executing service instance, using corresponding coordination models 132. That is, as referenced above and explained in detail below, each service may be represented, e.g., by the service regulator 112, as an XML document and/or Unified Modeling Language (UML) diagram or other appropriate expression thereof, as a coordination model in which an exposed interface of a given service is expressed as a plurality of states and transitions between the states, and in which the plurality of states corresponds to forms to be exchanged with the user as part of the execution of the service(s) in question.

Specific examples of the service coordinator 130 and of the coordination models 132 are provided below, e.g., with respect to FIGS. 11, 12, and 23.

In providing a consumer session in which one or more services are executed according to corresponding state-based coordination models, the service delivery manager 114 may include a forms mediator 134 which may use, among other possible resources, a plurality of forms templates 136, in order to exchange the service forms with the user, e.g., with the service consumer 122. That is, forms may be stored or referenced in a generic way, and in conjunction with forms templates which govern a presentation logic of the forms. Then, during execution of the service(s) in question, the forms mediator 134 may instantiate the generic form and associated template, e.g., based on a current communication channel 118a, or on a preference(s) of the user, or on various other factors. For example, the communication channel 118a may be characterized by use of a laptop computer running a particular operating system. The forms mediator 134, without prior knowledge of the specific communication channel 118a, may nonetheless provide an appropriate form(s) through the service consumer 122. Moreover, if a user of the consumer computing device 106a ends a current session and then begins a subsequent session using the consumer computing device 106b (e.g., a particular brand or type of smartphone), the forms mediator 134 may continue execution of services within the subsequent session, but now using forms appropriate to the new communication channel 118b. The system 100 thus leverages form mediation within the context of brokered service delivery to provide real-time, or just-in-time, form conversion in conjunction with each advancing service state of an associated coordination model.

An instance manager 138 may be configured to interact with the service coordinator 130 and the forms mediator 134, among other entities as described herein, and within a given session of the consumer session manager 126, to provide one or more instances of one or more corresponding services of the service registry 110. For example, when executing a brokered service delivery of a given service, a first service instance may be created by the instance manager 138, which may proceed according to a corresponding coordination model having ten serial states, using the service coordinator 130. In a first consumer session, the first instance may proceed through all ten states and complete, and then a second service instance may be instantiated, which may only proceed to a fifth state before an end of the current consumer session. At this point, the consumer session including the in-process instance may be stored within the session log 128 and/or the instance log 140. At a later time, the user may begin a second consumer session, during which the second service instance may be advanced through its tenth and final state and completed. Thus, more generally, within a given consumer session, one or more instances of (possibly related) services may execute to a defined state, or to completion, according to corresponding coordination models.

In some implementations, a service mediator 141 may be used to provide additional translation of messages received from the broker consumer gateway 116 for communication with specific services running on remote, backend systems of the service provider(s), e.g., services which are not (in whole or in part) onboarded within the service broker 104, and/or which require separate invocation for desired functionality for a given service instance.

A payment manager 144 may be configured to add payment functionality (e.g., generating amounts due and collecting funds in exchange for provided services). By themselves, techniques for collecting payment for goods and services provided over a network are, of course, well known, and are not described here in detail. However, various aspects of collecting payments are problematic in the area of delivery management of brokered services. For example, in a traditional ecommerce setting, goods or software applications may be purchased such that a one-time or recurring delivery is agreed to in exchange for payment rendered. Goods may be accumulated in a traditional shopping cart scenario, and a sum total may be calculated for some or all of the items.

However, during delivery of one or more long-running, stateful, multi-step brokered service(s), payment is often not such a discrete function. For example, different users receiving the same service may experience the service in different ways, and thereby incur different costs. Further, different combinations or groups of such services may thus result in even more complicated payment scenarios. In a long-running brokered service, partial payments may be received over time, and therefore must be tracked in order to avoid overcharging or undercharging.

Additional payment scenarios are described below, but, in general, it may be appreciated that the payment manager 144 and associated functionality is representative of additional considerations required in the setting of delivery management of brokered services. In particular, such considerations may arise, as just referenced, when such brokered services are provided in collections, combinations, bundles, or other groups.

Consequently, a service group manager 142 may be included in the service delivery manager 114 which may be configured to provide management of and for such service groups, which may thus be tracked and stored using a service group log 148. For example, the service group manager 142 may manage such a service group for a user within or across one or more consumer sessions, including, e.g., adding, updating, or removing service instances from a particular service group, or adding/deleting a service group as a whole. More generally, the service group manager 142 may be responsible for enforcing a number of different group-level attributes of a service group, such as adjusting a user authentication level relative to the service group as a whole. Additional aspects and features of the service group manager 142 and the service group log 148 are provided in more detail, below.

Thus, in the system 100 of FIG. 1, brokered service delivery may be managed in a manner that is standardized and widely-applicable, that ensures completeness and consistency of the delivery, and that allows the service provider(s) 102 and the service broker 104 to practice in their respective areas of preference(s) and expertise. For example, the service provider(s) 102 may focus on developing and improving its/their services, while allowing the service broker 104 to be responsible for delivering the services. Meanwhile, the service broker 104 may practice in the area of delivering and otherwise commercializing the services, with relatively less involvement in the particular business aspects of the services.

FIG. 1 further illustrates example systems and methods for delivery management of brokered services. The delivery management provides multi-channel service access, service instance management, service delivery configuration, grouped access to services, billing/payment functionality, and various levels of security (e.g., user authentication). These and other characteristics are discussed below, followed by specific examples and techniques for implementing these characteristics, e.g., in the context of the examples of FIG. 1.

As referenced above, the need for multi-channel service access reflects the fact that brokered service delivery often is associated with a high-volume, wide audience base and agile market penetration for new and unforeseen opportunities. The wider the audience and consumer segments, the more diverse the settings through which services are accessed and interacted with. Different settings mean more than different business channels (e.g., business application outlets for consumers to access services). They also entail different technical channels through which services are consumed, arising from different devices and different geospatial and temporal points of access.

To this end, the described examples are architected in a way that allows for their user interfaces to be adapted to different business and technical channels, e.g., using the forms mediator 134 and related structures and functions of FIG. 1. The user interfaces of a service are specified in a way that allows for flexible transformation to different channels; from the point of view of technical (device) presentation but also the business semantics of the channel. As described, for transactional services such as business formation, interactions with users may be long-running, e.g., going from days to months. To promote flexible interaction with the service, different channels are enabled, e.g., from standard browser-based channels to mobile and voice channels. Accordingly, the adaptation of service user interfaces is dynamic, depending on which channel is involved for a user interaction.

Further aspects of multi-channel service consumption in a diverse setting relate to the different environments, platforms and languages associated with channels. For consuming applications to interact with the systems supporting third-party intermediaries, requirements for software adaptation for consumer applications are kept to a minimum. For example, the service consumer 122 may be deployed as a proxy into channel environments to contain service interaction logic and messaging with intermediaries, thereby freeing consuming applications from these details. Such proxies thereby allow for intelligence in determining where user interfaces should be transformed during service interactions. For example, heavy-weight, business semantic transformations for business channel constraints and requirements may take place at the service delivery manager 114, while relatively lightweight device-specific transformations may take place through the consumer environment, e.g., in the service consumer 122.

As referenced above, the instance manager 138 provides for service instance management during delivery of brokered services. In this regard, it may be appreciated that an extent of service logic for a given service/service provider 102 that is exposed on the service broker 104 may be determined by a number of factors, including, e.g., the complexity of the service, the dependence between a business object state in hosted environments and the service, and a degree of trust between service providers and service brokers. For long-running services accessed through different sessions, the system 100 of FIG. 1 is capable, where necessary/desirable, of managing and storing their (data) state.

That is, it is possible for simple scenarios of brokered service delivery to retain such state information in the backend service application, so that the service provider retains full control of service orchestration logic, while the service broker 104 provides access to the service and may only have further involvement for billing/payments. However, even if services are adapted in this sense (e.g., for billing/payments), interactions in such scenarios may go through the broker before being adapted there and passed to the service applications, so that the state is still contained in backend service applications. In such scenarios, some state information, such as service progress, may be passed back through the service broker 104, however, for the most part, the parts of the service in the broker in such scenarios are largely stateless proxies to backend service applications.

For more sophisticated service delivery such as the system 100 is capable of, parts of service state and execution artifacts (e.g., code validation and forms) can be exposed onto the service broker 104, as described herein. By providing more detailed orchestration logic for stateful access routing purposes, the service broker 104 can provide business applications in the service for value-added service delivery, e.g., logging consumer choices as part of Customer Relationship Management (CRM), managing on-line settlements, and fulfilling services (including providing asset transfer through transport and logistics services). For stateful services, the service delivery manager 114, including the instance manager 138, may allow users to see activities involved in the lifecycle of the service, and may itself orchestrate individual steps (states) including allowing forms to be filled-in and submitted, and determining the relevant actions to be invoked on backend service applications in response thereto.

The service group manager 142 allows for services to be ordered in sets, e.g., as competitively priced offers that drive up demand, as functionally related groups that share a common purpose, or as single orders for customer convenience and single payments. A service bundle is an example of the first, where services are combined into one offer even if they are not necessarily related or cross-orchestrated. Credit card accounts, stock market reporting, and stock ordering through affiliated alliances, are examples of services that could be bundled together with a business formation service, but which are not critical for actual license provisioning. A composite service that has been created through a service marketplace is an example of the second. An e-commerce shopping cart for services is an example of the third. The business formation example(s) discussed herein has aspects of both the first and second forms.

As referenced above, groupings of services may appear at a surface level to have the same characteristics as grouped ordering of goods from e-commerce marketplaces; however, there are subtle and important differences. For example, services have an interactional pattern of execution, unlike that with goods, that need a refinement of the notion of grouping. Furthermore, execution of individual services results in certain data state which is relevant to other services that are part of a group. Sharing of mutable state for services in a group is thus one such difference. Furthermore, as services execute, referrals for further services may occur, e.g. for a business license provision requirement, an unforeseen service may be required for information to be provided to an already running service.

Hence, the service group manager 142 may provide dynamic addition of services to groups, as well as dynamic removal of services from groups. In considering removal of services, arbitrary removal may be prohibited for services which are still executing, so that, only abnormally or normally terminated services can be removed. For complex bundling requirements, constraints of what can be selected from bundles (e.g. one of, or all, services) as well as nesting of bundles are supported. Thus, the service group manager 142 supports grouped access to services which permit different business constraints for selection of services in bundles, sharing of state and, insertion and removal of service to be managed. Grouping of services may be persisted until all services have been delivered, after which the group may be removed.

A further distinction for services intermediaries compared to e-commerce goods marketplaces is authentication. Goods orders require that customers identify themselves and provide payment methods and shipping addresses in order to complete procurement processes. Services are not amenable to such a single security strategy, and involve different degrees of security sensitivity.

For example, services which provide freely available information do not need any user identification. For them, anonymous access is acceptable. At the other extreme, highly sensitive services such as obtaining a business license or applying for a passport carry major implications for the identity of individual and entities concerning services being accessed, risking identity fraud and other related risks. For these services, users need to be authenticated to the highest possible level of identification which ensures that the identity of a person is reflected in credentials and/or nominal details, provided by a user when accessing a service.

Of course, for other services, the security concern may be somewhere between these two extremes. Such services require identity details, although a certain level of trust is assumed or established elsewhere between the user, provider, and intermediary. In other implementations, a level of identification may be only required for a non-sensitive aspect like transfer of materials to a billing address (this is similar to the level of identity required in traditional Internet marketplaces).

Thus, the service delivery manager 114 may be configured to ensure that access to a service meets a required level of authentication for that service. Where services are accessed in the same session context, where identity has been made established through the session, the authentication may qualify for other authentication needs of other services accessed through the session. Repeated authentication per service accessed through the same session may be avoided unless needed by particular services. Ongoing authentication through subsequent sessions may be made to abide by the security requirements of the service.

Various other features and components may be supported. For example, the service broker 104 may show a usage history to the end user, e.g., a list of already executed service instances. The service broker may also allow users to access the details, e.g., data, of finished service instances, including access to the invoices that were created for a service instance during delivery or access to the payment receipts of a service instance that document which invoices were already paid and which are still to be paid.

Figure 3:
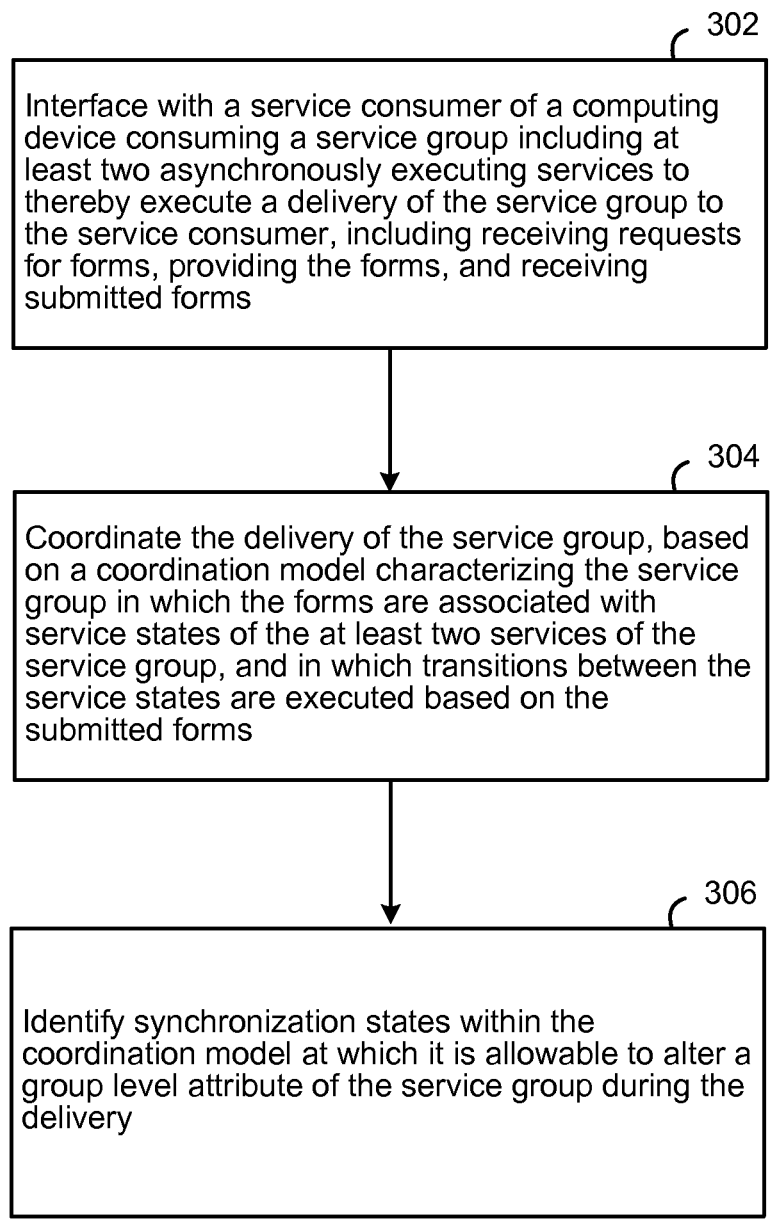
FIG. 3 is a second flowchart illustrating example operations of the system of FIG. 1.

FIGS. 2 and 3 are flowcharts 200, 300 illustrating example operations of the system 100 of FIG. 1. Although FIGS. 2 and 3 are illustrated sequentially, it may be appreciated that the mere ordering in this manner for purposes of illustration does not necessarily imply that the illustrated order is required, and, in fact, the various operations of FIG. 2 may operate in a different order(s) and/or in a partial or overlapping fashion.

In the example of FIG. 2, a service consumer of a computing device consuming at least one service of at least one service provider may be interfaced with, to thereby execute a delivery of the service to the service consumer, including receiving requests for forms, providing the forms, and receiving submitted forms (202). For example, the broker consumer gateway 116 may interface with the service consumer 122 to exchange forms created by the service regulator 112 which correspond to states of one or more services of the service registry 110.

At least one consumer session may be created, during which to execute at least a portion of the at least one service (204). For example, the consumer session manager 126 may create the consumer session uniquely identified with the relevant user.

At least one instance of the at least one service may be created within the at least one consumer session, the at least one instance being associated with a user of the at least one service (206). For example, the instance manager 138 may be configured to create such a user instance for the user, which may start and complete within a single consumer session, or which may start during a first consumer session, be stored in the instance log 140, and complete during a second consumer session.

The delivery of the at least one service from the at least one service provider and within the consumer session and the consumer instance may be coordinated, based on a coordination model characterizing the at least one service in which the forms are associated with service states of the at least one service and in which transitions between the service states are executed based on the submitted forms (208). For example, the service coordinator 136 may be configured to construct and store a corresponding coordination model in which the states of the at least one service are represented as forms, as just referenced, so that the service coordinator 136 may proceed with executing delivery of the at least one service by exchanging blank and completed forms between the broker consumer gateway 116 and the service consumer 122, and advancing a state of the coordination model through a corresponding transition(s) associated with each form exchange.

FIG. 2 thus describes example operations in which at least one service is delivered to a consumer through the service broker 104. In FIG. 3, additional or alternative examples are shown in which at least two services (i.e., a service group) are delivered to the consumer.

In the example of FIG. 3, a service consumer of a computing device consuming a service group including at least two asynchronously executing services may be interface with to thereby execute a delivery of the service group to the service consumer, including receiving requests for forms, providing the forms, and receiving submitted forms (302). For example, the broker consumer gateway 116 may interface with the service consumer 122 to deliver a group of services from the service registry 110. As described above, these services within the group may be asynchronous; e.g., may include services from one or more service providers which operate independently of one another but for the coordination thereof provided by the coordination model.

The delivery of the service group may be coordinated, based on a coordination model characterizing the service group in which the forms are associated with service states of the at least two services of the service group, and in which transitions between the service states are executed based on the submitted forms (304). For example, as just referenced, a coordination model may be stored with the coordination models 132 and accessed by the service coordinator to advance the combination of services within the service group through corresponding service states and thus to completion, as described herein.

Synchronization states may be identified within the coordination model at which it is allowable to alter a group level attribute of the service group during the delivery (306). For example, the service group manager 142 may be configured to identify a state within the coordination model at which it is permissible or desirable to change a group-level attribute of the service group, such as, e.g., an authentication level, a payment attribute, or an identity or other characteristic of a service member of the service group.

For example, a consumer may order two services in conjunction with one another. The first service may allow anonymous interactions, while the second service may require a username/password authentication. A coordination model may be constructed which coordinates delivery of both services as the service group, i.e., which includes states and transitions therebetweeen. In this case, a given state may serve as a synchronization state at which the user may be requested to provide a username/password.

After this state, the group-level authentication is raised. Thus, for example, if a third service is added to the group which requires a username/password, then it will not be necessary for the user to re-enter this information. If then a fourth service is added which requires additional authentication at a subsequent synchronization state (e.g., providing a digital certificate), then the group-level attribute of authentication level may be raised again to that level.

Analogously, there may be synchronization states at which other group-level attributes may be altered. For example, during delivery of the first two services of the group in the above example, a user may wish to make a payment related to both services, and a payment synchronization state may be included at which payment may be applied accordingly. As described herein, the payment manager 144 may be configured to optimize selection/inclusion of the synchronization state of the group coordination model at which payment should occur.

Another group-level attribute which may be altered at the synchronization state is the composition of services within the service group. For example, as described in more detail below, it may be necessary or desirable to add or remove an executing or (intentionally or unintentionally) terminated service. It may be undesirable or harmful to alter the service composition at an incorrect time, such as when a given service is still executing, or when a service is removed before its desired function has been completed. The service group manager 142 thus, as described, defines synchronization points within the group coordination model at which it is permissible to add/remove services or otherwise alter a composition of the service group.

In the above description, and in the following, the term consumer interaction management refers to all the necessary functionality for allowing consuming applications (e.g., the application 124) to interact with the service broker 104. That is, consuming applications, including service channels, on-demand services, and others may be understood to expose services and to allow end users or other applications to interact with them. These interactions, in the form of request-responses with services available through the service broker 104, may be carefully orchestrated such that the service broker 104 may process these, and, where required, invoke the backend or hosted applications of the service providers 102.

To facilitate interoperability between consuming applications and the service broker 104, and as described above, a single-point interface may be provided in the form of the broker consumer gateway 116, which exposes all the necessary service broker functionality, thereby freeing the consuming applications from requiring internal knowledge of service broker components (and methods on these components). As described in more detail below, FIG. 4 illustrates a specific example of a broker consumer gateway interface 400, which may be implemented as a Web Services Description Language (WSDL) based interface (or, in other examples, as a remote interface through language).

The broker consumer gateway interface 400 may allow for consuming applications to perform various functions. For example, it may allow users to access services anonymously and to provide authentication for services, with differing levels of identification, as referenced above. It may allow session management for different "login" sessions that a consumer (e.g., user and/or operator assisting users) have through channels accessing service broker functionality.

A consumer session (described in more example herein, e.g., with respect to FIG. 6), allows consumer activity with channels involving service broker functionality to be logged and tracked. Services can be accessed across multiple "login" sessions through different consumer sessions and/or services. The broker consumer gateway interface 400 may allow for services in service groups of users, supporting different e-commerce artifacts such as shopping baskets, service bundles and services composites, to be interacted with. The broker consumer gateway interface 400 may allow for a service instance to be created and deleted in the context of a service group, and to allow for a service instance to be interacted with, e.g., through requests to display forms and to submit filled in forms and actions through forms. In a final example(s), the broker consumer gateway interface 400 may allow payment interactions in terms of creation of, making, refunding, or getting and setting, payments on individual service instances or sets of service instances allocated to entire payment groups.

The example broker consumer gateway interface 400 of FIG. 4 is illustrated as a unified modeling language (UML) class diagram. In the example, key data required as input for operations are explicitly expressed as input parameters, while detail data may be encoded in an (XML) RequestDetails message. In this context, such a RequestDetails message may serve as a wrapper for specific message requests related to the different operations of the broker consumer gateway interface 400. In practice, all data may be encoded in the message. Thus, the broker consumer gateway interface 400 may provide a proxy for various methods from classes internal to the service broker 104.

As described above with respect to FIG. 1, to further facilitate integration with the service broker 104 for consumers, the service consumer component 122 may be deployed in the consumer's environment to interact with the broker consumer gateway 116/400. The service consumer 122 takes input request messages from consuming applications (e.g., the application 124), marshals these into specific method calls on the broker consumer gateway 116/400, and returns responses from services. The service consumer 122 thus alleviates the consuming application of the need for assembling and de-assembling form data in the form interaction logic of consuming applications, and alleviates the need for the consuming application to make calls to the broker consumer gateway 116/400.

The form interaction logic of consuming applications is offset by the service consumer 122, which prepares messages in the format that can be processed through the service broker 104, hiding a further level of complexity for consuming applications. The service consumer 122 also permits certain operations to take place on the client side, thereby introducing potential performance optimization. For example, transformation of forms for display on specific devices (e.g., using the forms mediator 134) may be wholly or partially performed by a service consumer instead of being performed through the service broker 104. In this case, the service consumer 122 may, e.g., translate device-specific form data into generically parameterized data of request messages. Correspondingly, the service consumer 122 may transform generically parameterized data of response messages from the broker consumer gateway 116/400 into device-specific data capable of being represented through forms on the device of the consumer.

Figure 5:
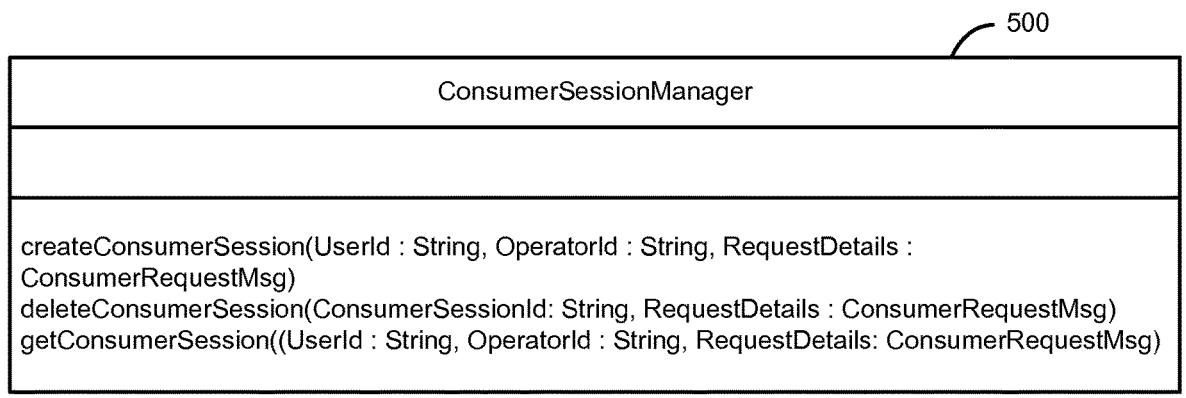
FIG. 5 illustrates an example of a consumer session manager interface.

To support session management for consumers and, in particular, to allow various user interactions that take place through the service broker 104 to be logged, tracked, and audited, the system 100 of FIG. 1 supports consumer sessions, e.g., using the consumer session manager 126 and the session log 128. FIGS. 5 and 6 provide examples of an example consumer session manager 500 and a consumer session object 600, as described below.

For example, a self-serve user (e.g., a customer) and/or a business channel operator (e.g. call centre or front-desk operator, operating on behalf of a customer) may be involved in a consumer session. The presentation of services occurs through channels in different consumer application settings. However, a consumer session may be created through the service broker 104 to manage and monitor interactions through the service broker 104. Data applying to the contexts of user interactions, e.g., geographic locality, may be stored in a consumer session (e.g., in session log 128), thereby allowing such information to be used through interactions with services in that specific session. In this way, consumer applications are freed from the need to provide such session management for users.

As referenced above, a particular requirement considered important for services, unlike the goods/information focus of e-commerce applications, is interactions with services across multiple sessions. In other words, a service may be accessed through different sessions, potentially through different technical channels (e.g., associated with different categories of device types). This is important for services involving multiple forms and interactions with agencies that cannot be confined to one "login" session. A consumer session allows "open" services from previous sessions, their groups, and other data relevant across all services being accessed, to be accessed through a single object handle.

Thus, the consumer session manager 500 of FIG. 5, shown as a UML class diagram, provides an example consumer session manager interface. The consumer session management interface 500 may be used to provide management of consumer session objects (e.g., the consumer session object 600 of FIG. 6), e.g., allowing logging/metering of consumer sessions each time they are created, updated, and/or deleted, as well as maintaining associations between users and their consumer sessions.

Functionality supported by a consumer session manager may include creation of a consumer session and maintaining users and their consumer sessions, getting a consumer session (e.g., providing the means for a consuming application or operator (on the user's behalf) to determine the consumer session that needs to be referenced for situations like auditing or service assistance), and/or deletion of a consumer session (e.g., deletion of a consumer session occurs when the user logs out or a session is timed-out).

A consumer session object, such as the consumer session object interface 600 of FIG. 6, may be used to provide the specific session context in which users interact through channels with the service broker during a particular "login". The consumer session object interface 600 may be used for accessing service groups, service instances, and other objects managed through the service broker 104 and user interactions. The "user" associated with a consumer session in this context is a user (e.g., the end consumer whose identity and location pertain to corresponding data in services) and/or channel operator (acting on behalf of the end consumer). Self-serve users may "login" anonymously and then identify themselves to different levels of identification, depending on the security requirements of a service that is requested and accessed. Once a user has been identified, details may be made available for other services available through that consumer session.

Various functionality may thus be supported through a consumer session. For example, user authentication may be executed which takes place as part of initial login, or during access to a specific service which warrants a (stronger) identification corresponding to a particular authentication level. Once a user has been authenticated, user information may be made available for other services being accessed through the session. After the session completes, authenticated user information may or may not be automatically available for subsequent sessions. The consumer session object 600 also provides for assigning users to service groups when users are authenticated. That is, user assignments may be based on user identities, which can be at different authentication levels. When these change, due, e.g., to stronger authentication requirements as security sensitive services are accessed, the identities of users will chance. All service groups of users may then change as part of re-assignments.

The consumer session object interface 600 also facilitates creation and deletion of service groups, e.g., allowing generic support of service bundles, shopping baskets and other forms of service collections and composites to be managed as a group. This may facilitate getting handles to service groups; e.g., getting a particular service group or getting all service groups of a user. The latter is used, for example, for re-assignments of service groups to users. The consumer session object 600 may be used to get and/or set a default service group for a user, since a user may have more than one service group.

The consumer session object interface 600 may be instrumental in creating/deleting service instances, and/or in adding and removing services instances from service groups and moving services between service groups. Thus, different stages for ordering, removing, and managing services may be supported. For example, as described herein, when a service bundle is ordered, a service group may be created to manage the service bundle. Then, a service instance may be added to the service bundle after the original services in the bundle have been accessed. Meanwhile, removal of a service instance may be required if the service is no longer needed. However, the service instance may be prevented from being removed during the processing stage of its lifecycle.

The consumer session object interface 600 allows for consumer-oriented interactions with service instances. Such interactions may include getting forms so that data can be filled in for a step in a service, or submitting a filled-in form which requests an action on a service. To simplify interactions, a consuming application (e.g., 124) need only pass a request with the details contained in a request message. The actual nature of the request can be determined by a service consumer 122, Broker consumer gateway 116, or by the consumer session.

The UML class diagram in FIG. 6 provides a sample consumer session interface that may be used for the above and other functions (e.g., payment functions), as illustrated.

The consumer session interface 600 of FIG. 6 may be made available as a local interface, and need not be directly accessed remotely.

As referenced above, operations that the consumer session performs, as described in FIG. 6, may be logged using the session log 128. Table 1 identifies information that may be collected for consumer session logging.

TABLE 1

| Element | Description | Data Type |
|---|---|---|
| ConsumerSession Id | The unique identifier for the active consumer session | long |
| Channel Id | The unique identifier of the channel where the service group was accessed | String |
| Operator Id | The unique identifier of the operator | string |
| User Id | The unique identifier of the user that the consumer session pertains to (may be anonymous or pseudo-anonymous) | string |
| Log Timestamp | The action date and time | date & time |

Figure 7:
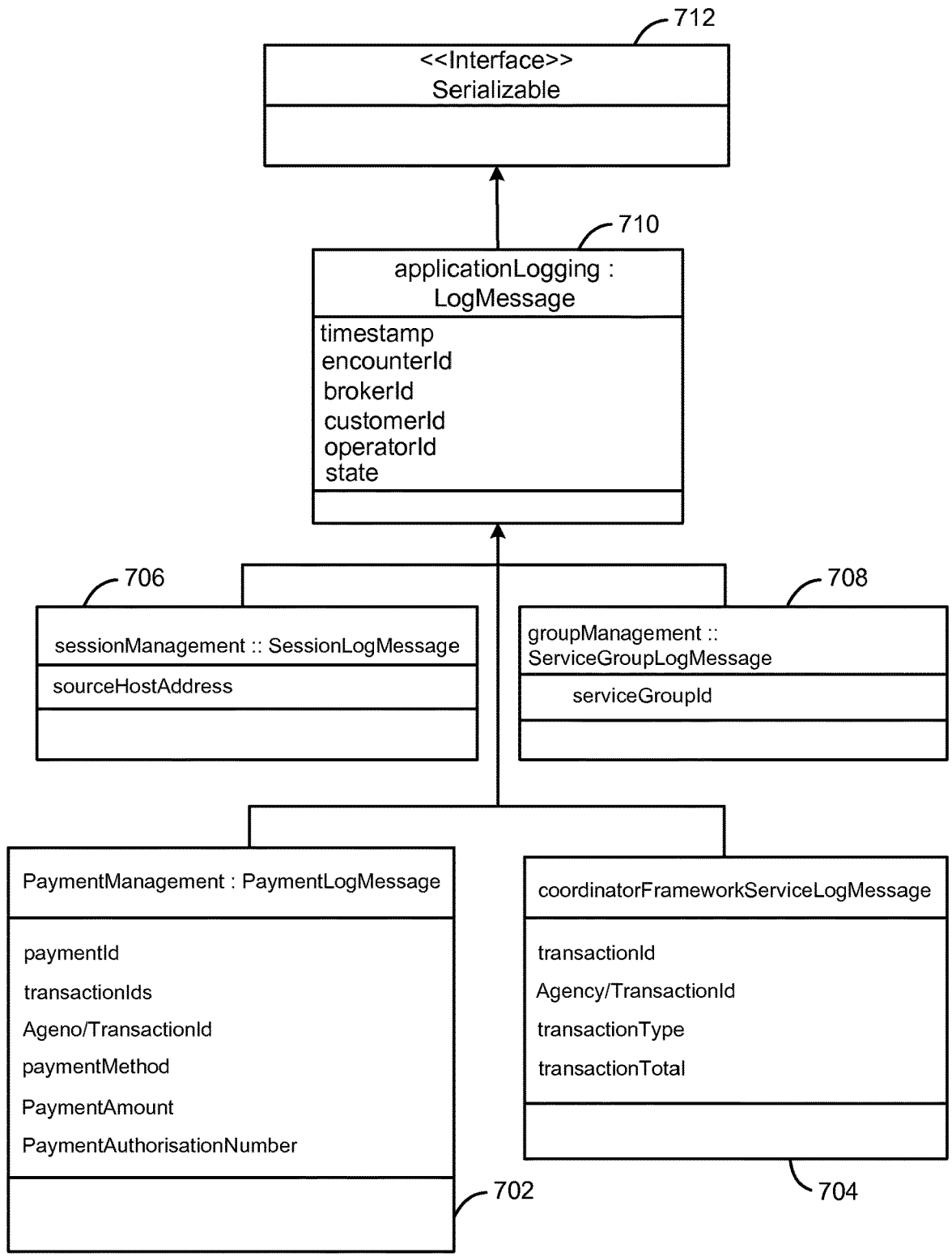
FIG. 7 illustrates a class diagram illustrating an example of session logging.

The session log 128 thus receives messages from the consumer session objects and generates a database log entry for each of the messages that it receives. FIG. 7 illustrates a UML class diagram illustrates an example of session logging. Specifically, a payment log message 702, a service log message 704, a session log message 706, and a service group log message 708 may be used to create a log message 710, as shown, and passed using the interface 712 for entry to the session log 128. The SessionLogMessage object 710 is thus passed into the session logger 128 as the message body.

Figure 8:
FIG. 8 provides an illustration of a service group manager interface.

FIG. 8 provides an illustration of a service group manager interface 800 associated with the service group manager 142 of FIG. 1. As referenced above, service channels 118a, 118b and consuming applications (e.g., 124) that make use of service marketplaces, service directories, business networks and other forms of service ecosystems/hubs, allow for services to be ordered and accessed in collections or groups. Examples are service bundles, e-commerce shopping baskets, and composite services like business processes. The grouping of services together carries implications for sharing of common data, common interactions which can be performed for the group like payments, and service incentives like allocation of discounts and rewards. The requirement for the management of generic containers or groups of service at the service broker 104 alleviates consuming applications from having to provide this functionality.

Thus, the service group manager interface 800 provides a single point of management for service groups created within the service broker 104. It records and manages which service groups are associated with users, and acts as a façade for the creation, location of, and deletion of service groups, hiding the client from possible changes to the implementation of service groups. Service groups are persisted across consumer sessions, so when a user "logs-in" and a consumer session is created, the service groups of that user can be accessed through that session and will have the same state as they were left in previous consumer session.

The service group manager interface 800, illustrated as a UML class diagram, provides a number of different functionalities. For example, it supports creation and deletion of a service group. In this regard, service groups may be created by default when a consumer session is created, acting as a default container of service instances ordered and accessed during that session. When a service instance is created, it is assigned to the default service group until it is explicitly assigned by the user to another service group. A service group is also automatically created when a service instance is a composite service, e.g. a service bundle. Finally, a service group can be created explicitly. Service groups may be part of other service groups. Deletion of a service group may be prevented it contains active service instances (i.e. services which have not reached a terminated state).

The service group manager interface 800 also may be configured to retrieve one or all service groups of a User, to add a service instance to a service group or remove one or all service instances from a service group, or to move one or all service instances from one service group to another. The service group manager interface 800 may get/set a default service group of a user should he/she have more than one service group, and may assign users to service groups when users are authenticated (because user assignments may be based on user identities, which may be at different authentication levels).

Figure 9:
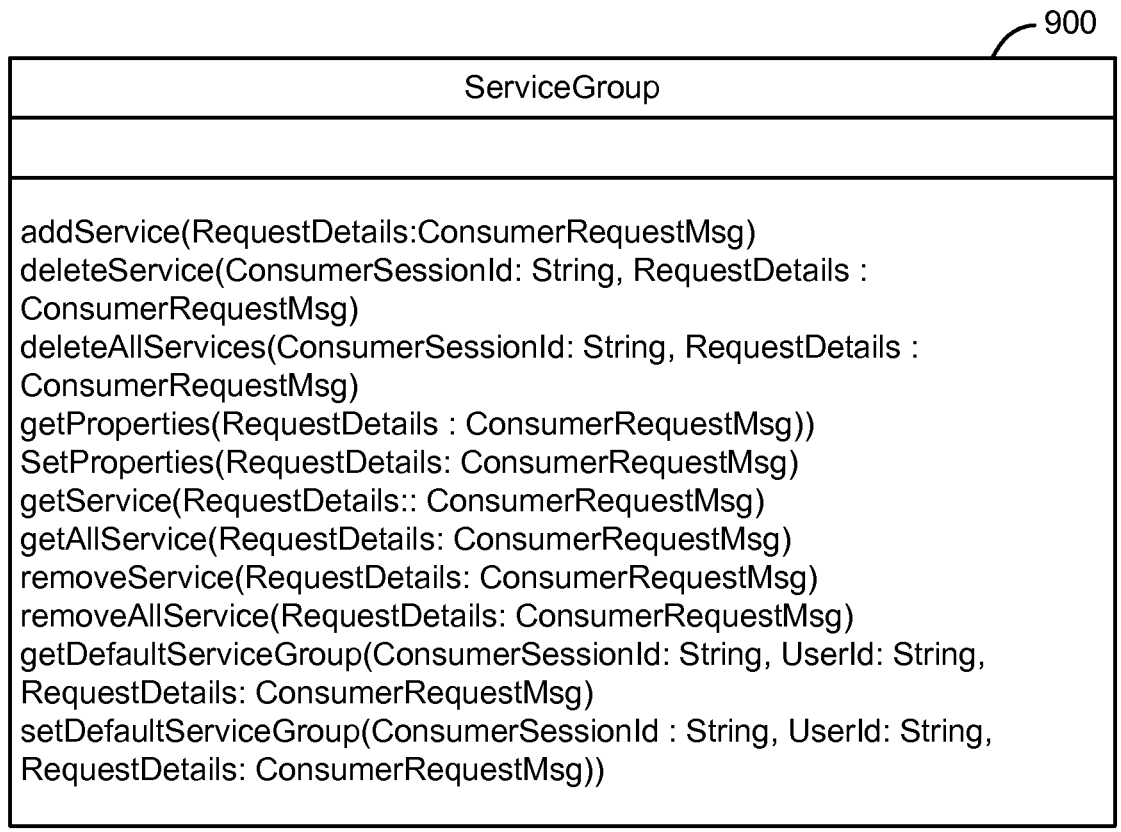
FIG. 9 illustrates a service group object, shown as a class diagram, which may hold zero or more service instances on behalf of a user.

FIG. 9 illustrates a service group object 900, shown as a UML class diagram, which may hold zero or more service instances on behalf of a user, thus providing a convenient management of ordering and accessing the services in some related way. In this regard, different types of users may have access to different subsets of the service group functionality. Guests, or users who have not "opted-in" or are interacting with the service broker 104 anonymously, may be restricted to one service group at any given time, whereas named/authenticated users can have one or more (named) service group(s).

Functionality supported by the service group object 900 may include adding a service instance to the service group, or deleting one or all service instances from the service group. Service instances that are currently "active" may be required to reach a termination state before they can be deleted from a service group, although such a requirement would not prohibit service instances from being moved to another service group by the service group manager/interface 142/800. The service group object 900 also may be associated with getting and setting properties related to the service group, getting one or all service instances of the service group, or removing one or all references of the service instances to the service group. In the latter regard, removal of a reference does not delete the service instance, but simply removes the service instance's association with the service group. This function may be used in conjunction with deleting service instances, service groups, or moving service instances between service groups.

Actions performed on a service group may be logged using the service group log 148. These actions may be recorded in a generic sense, providing users with a historic record of the actions performed on each of their shopping baskets or other activities. Table 2 identifies information that may be collected for service group level logging.

TABLE 2

| Element | Description | Data Type |
|---|---|---|
| ConsumerSession Id | The unique identifier for the active consumer session | long |
| Channel Id | The unique identifier of the channel where the service group was accessed | string |
| Operator Id | The unique identifier of the operator | string |
| User Id | The unique identifier of the user that the consumer session pertains to (may be anonymous or pseudo-anonymous) | string |
| Log Timestamp | The action date and time | date & time |
| service group State | The state or action performed on the service group | string |
| service group Id | The unique identifier for the service group | long |

Figure 10:
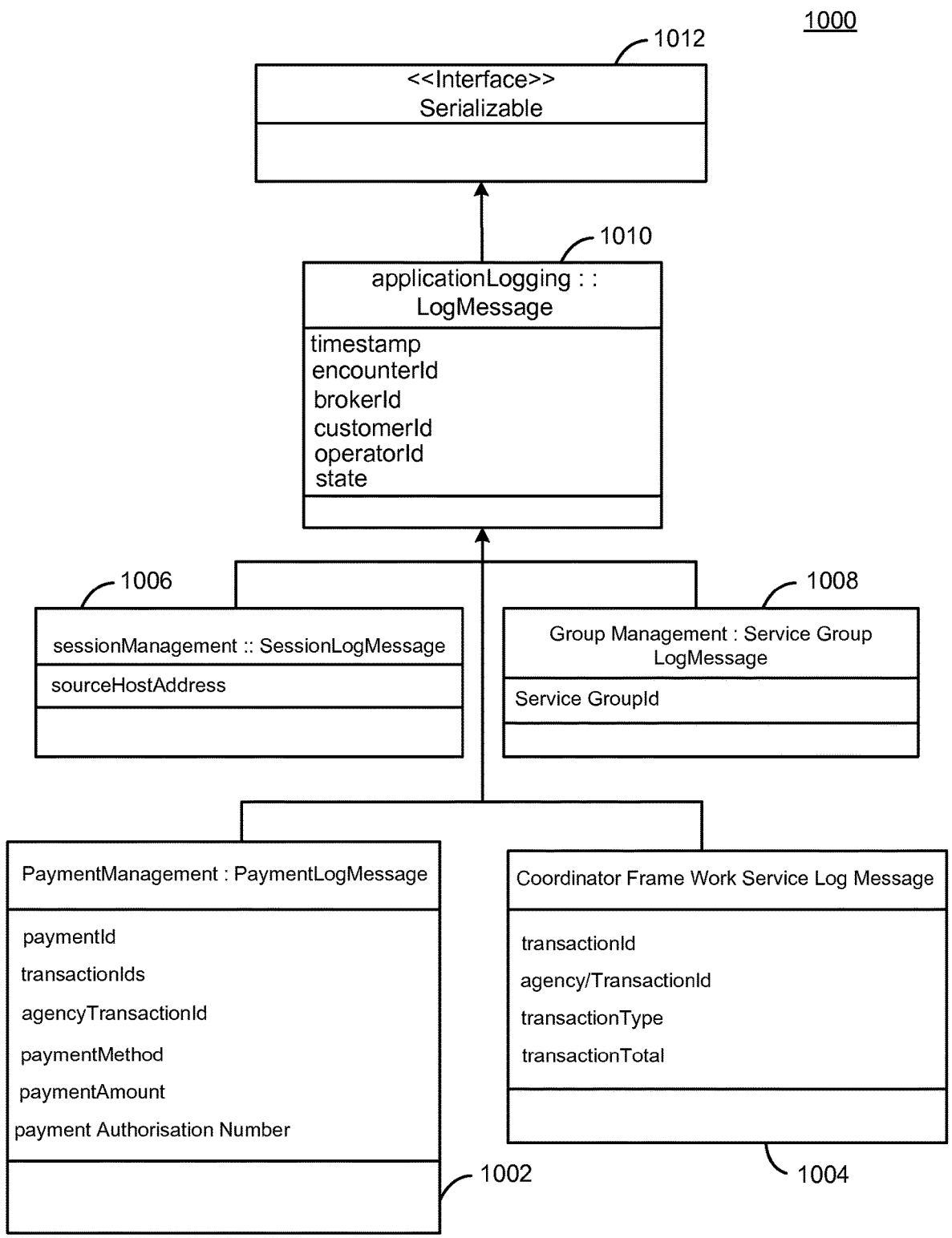
FIG. 10 illustrates examples of message logging.

The service group log 148 receives messages from the service group manager/interface 142/800 and associated service group objects 900, and then generates a database log entry for each of the messages that it receives. Similarly to FIG. 7, the UML class diagram of FIG. 10 illustrates such messages at a payment log message 1002, a service log message 1004, and a session log message 1006, which are provided in association with a service group log message 1008 to be passed into log message 1010 and ultimately passed into the service group logger 148 through the interface 1012 as the message body. The information of at least the service group management object 1008 may thus be used to produce the appropriate log information.

Figure 11:
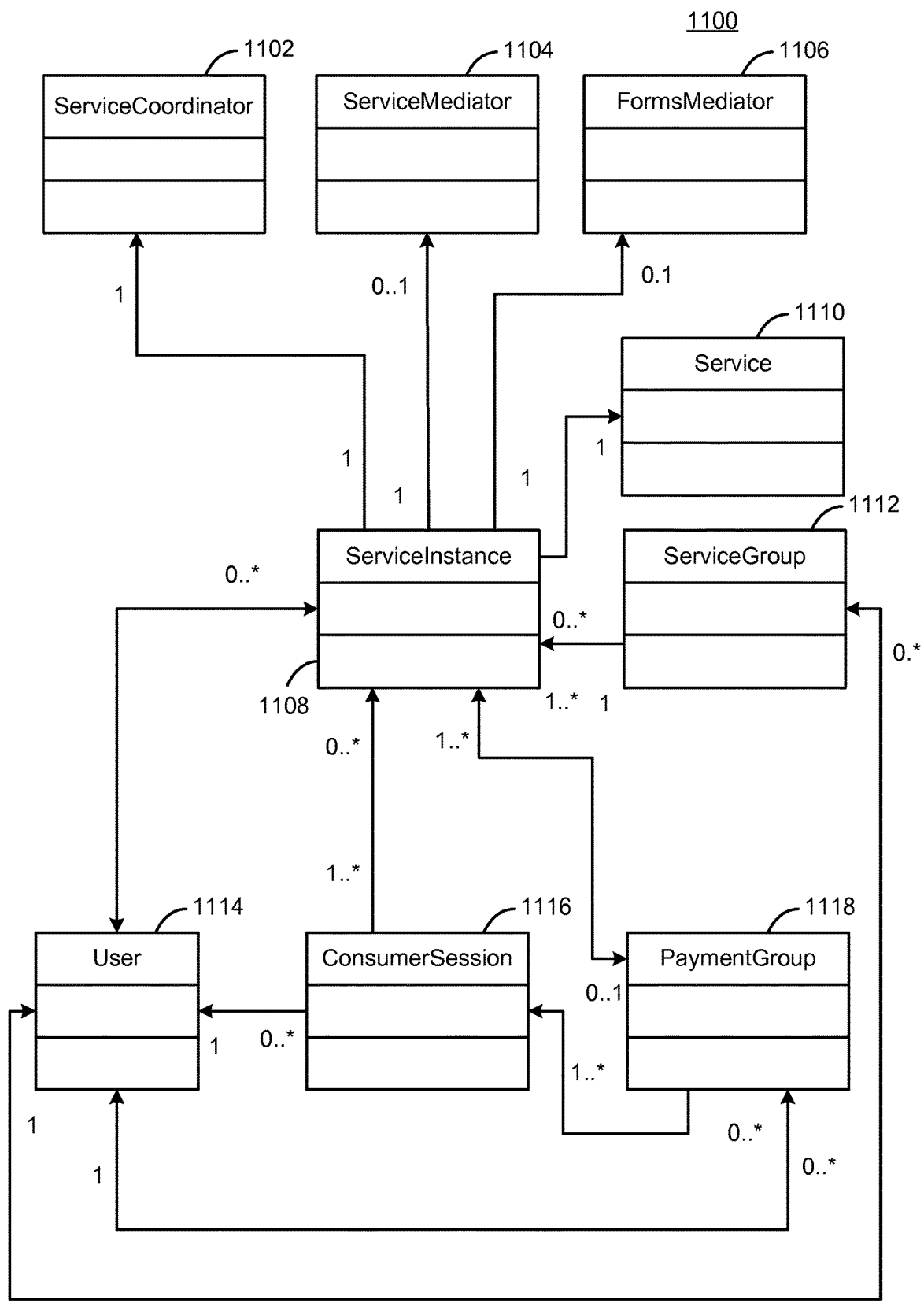
FIG. 11 is a block diagram illustrating techniques associated with service instance management.

FIG. 11 is a block diagram 1100 illustrating techniques associated with service instance management. Specifically, as referenced above, services, as published and managed through the service broker 104, may require a number of objects for delivery through the service broker 104. FIG. 11 is illustrated as a UML class model for the key classes involved in processing services (i.e., for processing associated service instances) in order for user interactions to be executed.

The root of a service, containing all relevant information and sources that are relevant for its publication and access through the service broker 104, is a service 1110. The service 1110 thus provides a "single-point" reference for all the descriptions, artifacts, configurations, and constraints of a service on a type-level. Through it, all service-related information, execution classes and other artifacts can be generated, enlisted, deployed, or otherwise used, in the service broker 104, so that services can be discovered, ordered, and instantiated. The service object 1110 is created through the service package deployed onto the service broker 104 as part the service's deployment from its service provisioning environment.

The service 1110 may contain service descriptors (which are stored in the service registry 110 for search/discovery), as well as any exposed steps of execution (and forms used for interactions with these steps). The service 1110 may include data sets and code which are deployed to allow for validation steps to be accessed efficiently, without requiring invocation of the remotely hosted backend service application. For example, local validation may be permitted for data look-ups used in a service, which could be executed through the service broker 104.

A service mediator 1104, analogous to the service mediator 141 of FIG. 1, may be used for the service 1110, so that messages are translated for communication with backend service applications running in remote, hosted environments (e.g., used by the service provider(s) 102). Somewhat similarly, a forms mediator 1106, analogously to the forms mediator 134 of FIG. 1, may be used to transform forms to particular channels (e.g., device-specific presentation, re-presentation of form fields, or advertising).

When a user 1114 requests a service (e.g., through a consuming application), a service instance object 1108 is created, e.g., by the instance manager 138. A service instance may be uniquely identified for across all instances ordered by users, and will exist until service completion or deletion. In addition to storing and tracking all instance-specific information of the service as it is executed, a service instance 1108 makes use of a number of objects and data files that support its execution through the service broker 104. These are all created for it using a service upon creation of the service instance. A service instance deployment descriptor may be used to define different delivery configurations and constraints of a service, and links to related artifacts which have various details of service execution, that are created as a result of ordering negotiations that take place with a user.

In terms of relationships and constraints against other classes managed through the service broker 104 as described above, a service instance may have the following characteristics. For example, a service instance may belong to one user although a user 1114 may have ordered more than one service instance. The service instance is instantiated out of one service (type), while the service can have one or more service instances. A service instance may be interacted with through one or more consumer session(s) 1116, and a consumer session may involve zero or more service instances. A consumer session is that of only one user and a user may have zero or more consumer sessions. A service instance is allocated to only one service group, while a service group may have one or more service instances. A service group 1112 belongs to one user, while a user may own zero or more service groups. A service instance may be allocated to a payment group 1118 while a payment group has one or more service instances. Service instances may have supportive execution components in the form of, e.g., a service coordinator 1102, service mediator 1104, and forms mediator 1106, as discussed herein.

The details of service execution steps of a service instance including business applications invoked through the service broker 104 for delivery (e.g. payments) are managed through the service coordinator 1102, representing functionality of the service coordinator 130 of FIG. 1. Through it, a service instance can be executed through different service delivery models (e.g., service mediation) that are supported through the service broker. The details of orchestration are stored in a coordination model (of the coordination models 132), managed through the service coordinator 1102. Thus, the service coordinator 1102 and associated coordination model maintains the allowable interactions that are managed for a service 1110, concerning both front-end and backend actions, and their allowable order of execution. In this way, the execution order of steps for a service can be transparent, allowing for convenient update of delivery configuration (e.g. for payments collected through the service broker 104), functional extension for aggregation with other services, and tracking during execution. Interactions may relate, e.g., to requests for forms and the actions and form data submitted by users requesting a service action. In the mediated delivery model, the service broker 104 manages requests to the backend service applications for execution of actions and responses returned.

Figure 12:
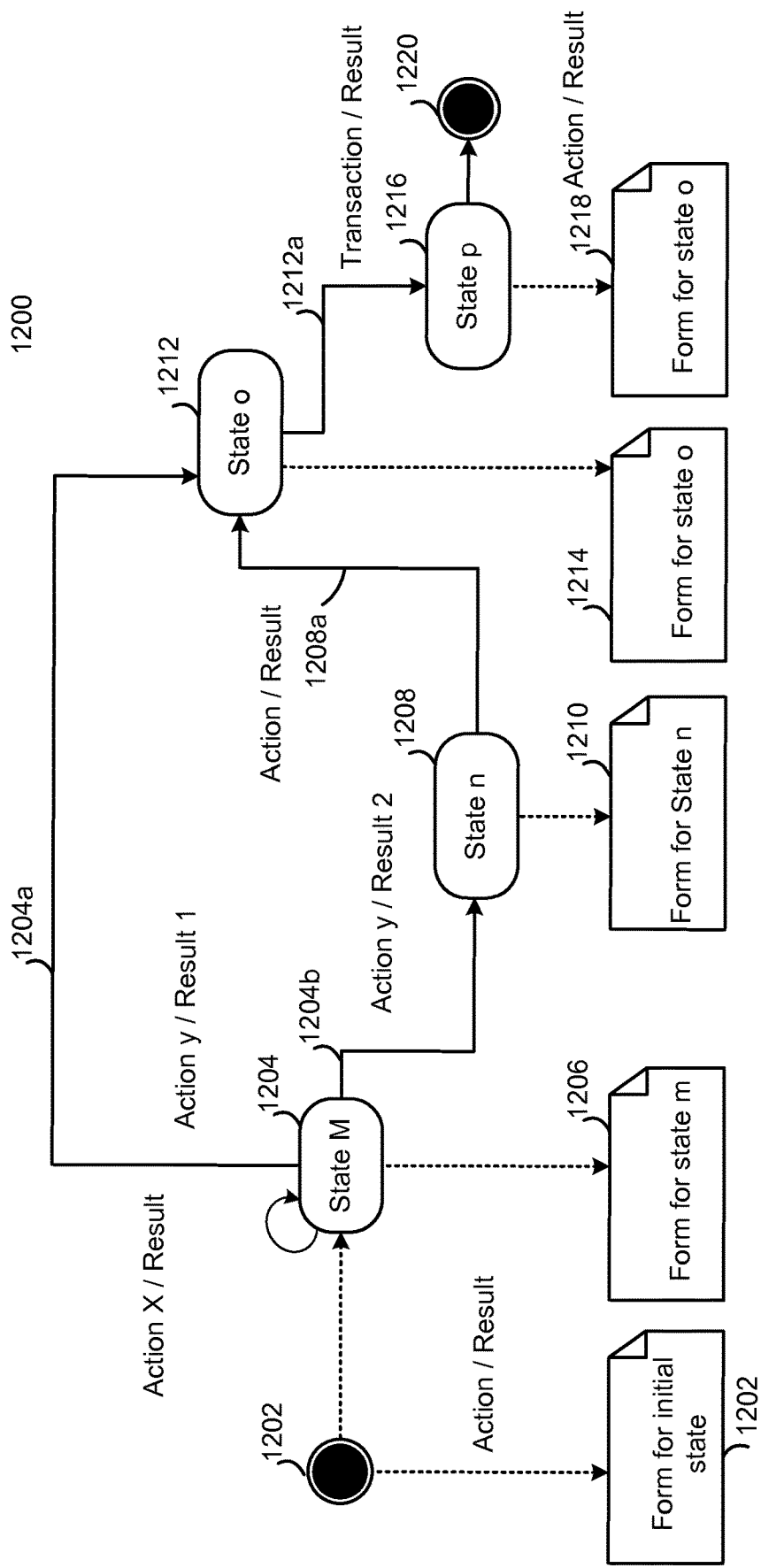
FIG. 12 is a block diagram of a coordination model.

FIG. 12 is a block diagram of a coordination model. In the example of FIG. 12, the coordination model 1200 is illustrated as being adapted from finite state machines, and allows flexible ordering of interactions, e.g., front-end interactions from users through Web pages. However, a flow-based business process model may also be used.

In the example of FIG. 12, a coordination model 1200 is illustrated as having a set of states (nodes) 1202, 1204, 1208, 1212, 1216, and 1220, and transitions (links between nodes), including transitions 1204a, 1204b, 1208a and 1212a, as shown. Each state of a service represents a discrete point during service execution, where one or more interactions can proceed. States include the standard initiation and termination states 1202 and 1220, and service-specific states 1204, 1208, 1212, and 1216, in between these states. A hotel booking service, for instance, may have "initiated", "reserved", "booked", "checked out" and "cancelled" states.

In an "initiated" state, the service can progress to either "reserved", "booked" or "cancelled" depending on the interactions that occur.

User interactions take place through user interfaces of services and form interactions, using, in FIG. 12, forms 1203, 1206, 1210, 1214, and 1218, as shown. In a given state, a customer should be able to obtain a form, fill it out and submit it for a requested action. The result of the action is to progress the service to the next relevant state. Ultimately through user interactions, the service should be progressed to the termination state 1220.

User interactions may thus take place through forms that can either be retrieved from the backend service application or are cached in the service instance as part of the coordination model 1200. For forms which need to be retrieved from the backend service application, the application may be called. For the cached situation, states may be associated with a form template (as shown in form templates 136 in FIG. 1) which defines the structure for forms associated with that state to be rendered as part of the way the service is presented as a user interface (UI) to the user. For example, if three forms need to be filled in with customer details for a hotel booking, then the form data will be structured according to the form template. Form templates are defined independently of specific UI technologies to allow for services to be presented to a variety of UI technologies (e.g., Web browser or different brands/types of smartphones) to be leveraged for service presentations. In this way, the relevant form for a service's particular state can be sent to the user for an interaction to proceed. For example, in some implementations, a form template may be constructed using the XML-based XForms.

A user interaction may thus involve one or more forms being filled in and an action selected and submitted to the service. For example, in the hotel reservation example, a user may select the "Book" action after filling in customer details through the three forms, for the hotel service. Through the forms being entered by a user, a choice of more than action can be selected. For example a "Book" or "Cancel" action may be requested, though only one action can be requested to the service at a time from the point of view of the user. Therefore, more than one action can be exposed, through the forms that are presented, for a given service's state. When an action is selected and submitted to a service, it may be passed (mediated) to the backend application (implementing the service). The application may respond in different ways, for example a booking for the hotel may be accepted or rejected.

The action requests and responses on services are modeled as transitions in the coordination model 1200. When an action is requested by a user in a given service's state, one of a set of transitions labeled by the action is relevant. For example, in FIG. 12, one of the "action y" transitions 1204*a*, 1204*b* are relevant when a service is in state "State m" 1204. In this example, only one "action y" 1204*a*, 1204*b* can be selected by the user. Once the service is invoked for the operation corresponding to an action, a specific transition is selected through the response that comes back. Hence for the service's "State m" 1204, either of the two outgoing transitions is selected depending on whether response "response 1" or "response 2" was selected.

Thus, executing the coordination model 1200 means that when a given state of a service is reached (apart from the termination state), the corresponding form template is selected and used to generate the form (viz. forms and their sequences) sent to the user. One of the outgoing transitions from that state is selected as a result of the user-requested action, and the backend service application response (e.g., denoted "<action-name>/response-name>"). As a result, the succeeding state linked to the selected transition is reached, and the whole process is repeated. In the "terminated" state, no further transitions can be taken is the service is terminated. At this point the service instance can be deleted.

Figure 13:
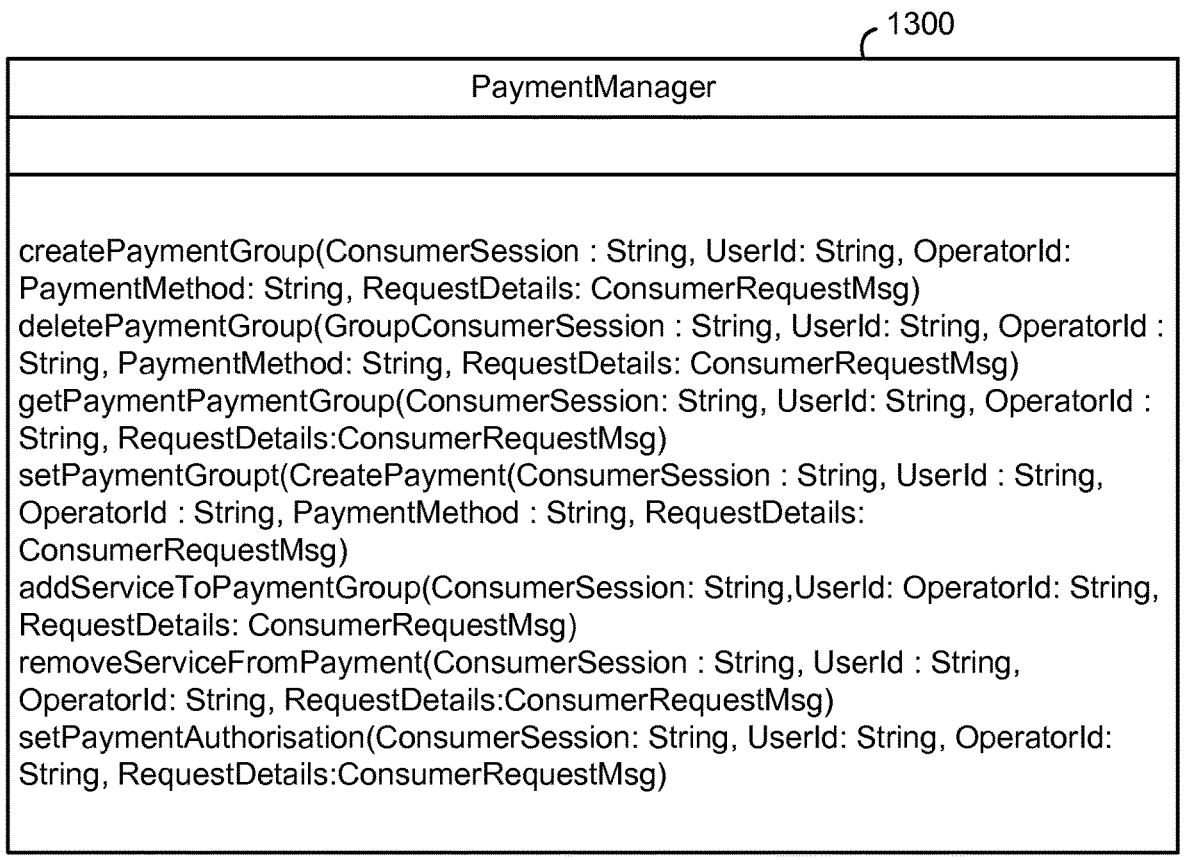
FIG. 13 is an example of a payment manager interface.

FIG. 13 is an example of a payment manager interface 1300, representative of functionality of the payment manager 144 of FIG. 1. As referenced with respect to FIG. 1, payment requirements may be abstracted as payment conditions, regardless of what pricing model applies for services. A payment condition may apply to a particular part of a service's lifecycle, specifically an execution step, e.g., collection of a partial payment for the next step of a service to proceed. Checks for consistency and completeness of payment and other service delivery entities can be done automatically through semantic reasoning. For example, if a partial payment is made for one step, it may be made mandatory that remaining payment take place in a subsequent step of the service. As shown, the payment manager 1300 may implement functionalities including creating, deleting, or retrieving payment groups, and also may be responsible for adding or removing services to/from payment groups, and for authorizing payments.

A payment object allows for payment requirements of one or more services to be satisfied. Service instances allocated to a payment object may come from a service group or different service groups.

Credit and debit apportioning of payment fees to different partners may also be managed by the payment objects. For example, a service broker may require fees for brokerage, advertisers may subsidize a part of service costs, providers may require core transaction costs of the service, and consumers may pay for the service costs minus subsidies. Accordingly, a payment schedule with the different credit/debit transactions should be created and executed through the payment object. Imbursement of service costs from consumers and other partners (like advertisers) and disbursement of service costs to service partners occurs through different processes.

Payments may be executed when a payment object passes a payment request to the service broker application that passes this on to a payment engine. Choice of payment engine is selected based on the payment method nominated. The request is processed, and the response returned may determine whether the payment condition of the payment object is satisfied. If it is, then the underlying state(s) of the services is advanced to the next state, e.g. so that a transaction phase may proceed.

The Payment Manager 1300 is responsible for the creation and location of payment objects, as well as being able to fulfill the transaction requests issued by the service broker. As just referenced, functionality supported by the payment group manager interface 1300 includes creation and deletion of a payment group (payment groups are created and deleted in a consumer session), getting and setting payment groups so that their details can be updated or they can be deleted, adding and deleting service instances from payment groups, and setting authorization details of payment groups (e.g., allowing a consumer session to set an authorization number, or providing the consumer session with a mechanism to update the payment group once a payment response message has been received from an invoicing/receipting system. Such a number may be used to fulfill the logging and auditing requirements associated with the payment functionality). The UML class diagram in FIG. 13 provides a sample payment manager interface. It should only be available as a local interface, as it is not directly accessed remotely, but rather through a consumer session.

A payment group, e.g., implemented using the payment group interface 1400, logically represents a single payment that covers one or more service instances and it may contain service instances from more than one service group. This supports the different ways that a payment group can be used. A user may wish to only pay for a single service. This service is added straight to the payment group. More generally, a user will select a number of services (one or more) to pay for, and then trigger the payment action. All of these selected services may be added to the payment group at group construction time. Alternatively, a user may asynchronously add services to the payment group after it has been created. The payment group may be associated with the consumer session that it was created in, for auditing purposes (e.g. tracking the user and operator who were responsible for acting on payment actions).

The functionality supported by the payment group interface 1400 may include addition and removal of service instances from the payment group, and getting and setting payment details of the payment group (e.g. setting the payment method of the payment group, or making payments). Actions concerning payments may be made by setting payment details while the payment manager (interface) 144/1300 of the service broker 104 is responsible for acting on scheduled actions, e.g. performing funds transfer associated with a payment action. Further, payments may be cancelled/refunded, as needed, and transaction totals may be obtained for a given payment group. The UML class diagram in FIG. 14 provides a sample payment manager interface.

All actions performed on a payment object may be recorded, providing users with a historic record of the payments that they have made. Table 3 identifies the information that needs to be collected for such payment logging.

TABLE 3

| Element | Description | Data Type |
| --- | --- | --- |
| consumer session Id | The unique identifier for the active consumer session through which the payment was processed through | Long |
| Channel Id | The unique identifier of the channel where the payment was recorded | string |
| Operator Id | The unique identifier of the operator | string |
| User Id | The unique identifier of the actual consumer/customer | string |
| Payment Timestamp | The time and date of the payment | date & time |
| Payment State | The state of payment processing | string |
| Payment Id | A unique identifier for the payment, used as a payment confirmation number | Long |
| Transaction Id(s) | The identifier(s) for the service instances(s) being paid. More than one service instance can be selected for a single payment. These identifiers will be stored together in the one log entry. | string |
| Agency Transaction Id | The agency identifier for its service transaction. It is assumed that any invoice details are stored at the agency against this identifier. | string |
| Payment Method | The method chosen to make the payment | string |
| Payment Amount | The total amount being paid | double |
| Payment Authorization Number | A unique identifier from a payment engine confirming acceptance of payment (optional depending on amounts) | string |

In FIGS. 15-26, examples are given for example scenarios that may be implemented by the service delivery manager 114 of the service broker 104. The scenarios are illustrated through interactions expressed as UML Sequence Diagrams. The list of scenarios is not illustrative, non-limiting, and not exhaustive.

Figure 15:
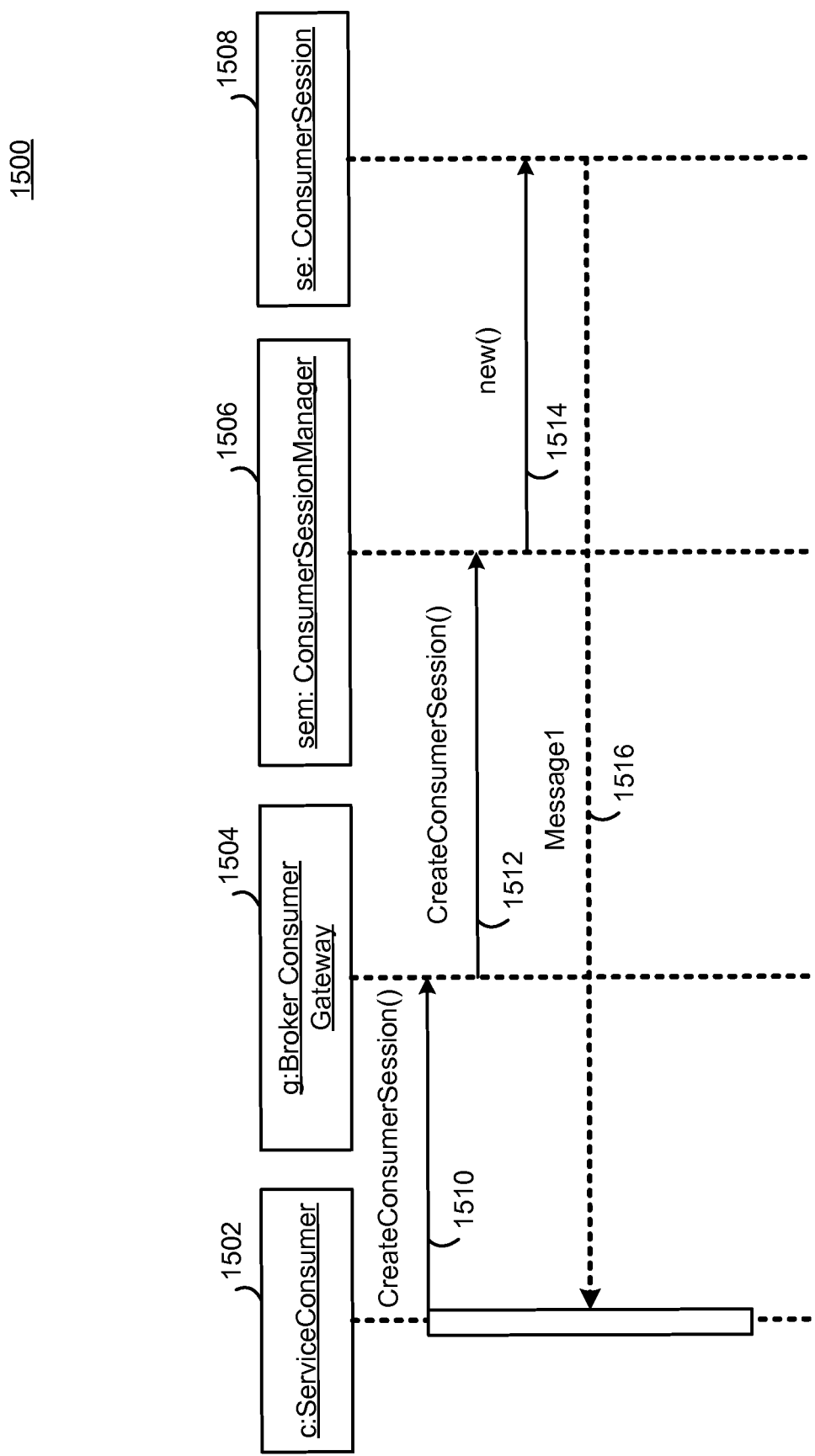
FIG. 15 is a sequence diagram illustrating creation of a consumer session.

FIG. 15 is a sequence diagram 1500 illustrating creation of a consumer session. As referenced above, consumer sessions may be created automatically when users/operators either "login" through a consuming application (at service channel), making use of service broker functionality, or when service broker actions are first initiated through a consuming application, e.g., when queries are submitted to service broker's discovery system.

Thus, in FIG. 15, service consumer 1502, broker consumer gateway 1504, consumer session manager 1506, and a consumer session 1508 communicate as shown and described. Specifically, a consuming application requests creation of a consumer session (1510). While an explicit method, createConsumerSession( ), is illustrated, a more generic processRequest( ), containing a create consumer session request, could also be used.

The creation request communicated to the service broker through the Broker consumer gateway 1504. The broker consumer gateway 1504 creates a consumer session Manager 1506, where pre-existing consumer session managers may be invoked (1512).

A consumer session 1508 may be constructed through the consumer session manager 1506 (1514). The handle of the consumer session is passed to the service consumer (1516). As described herein, authentication may be required as part of creation of a consumer session, but is not illustrated here because it is assumed for the example that user has connected anonymously.

Figure 16:
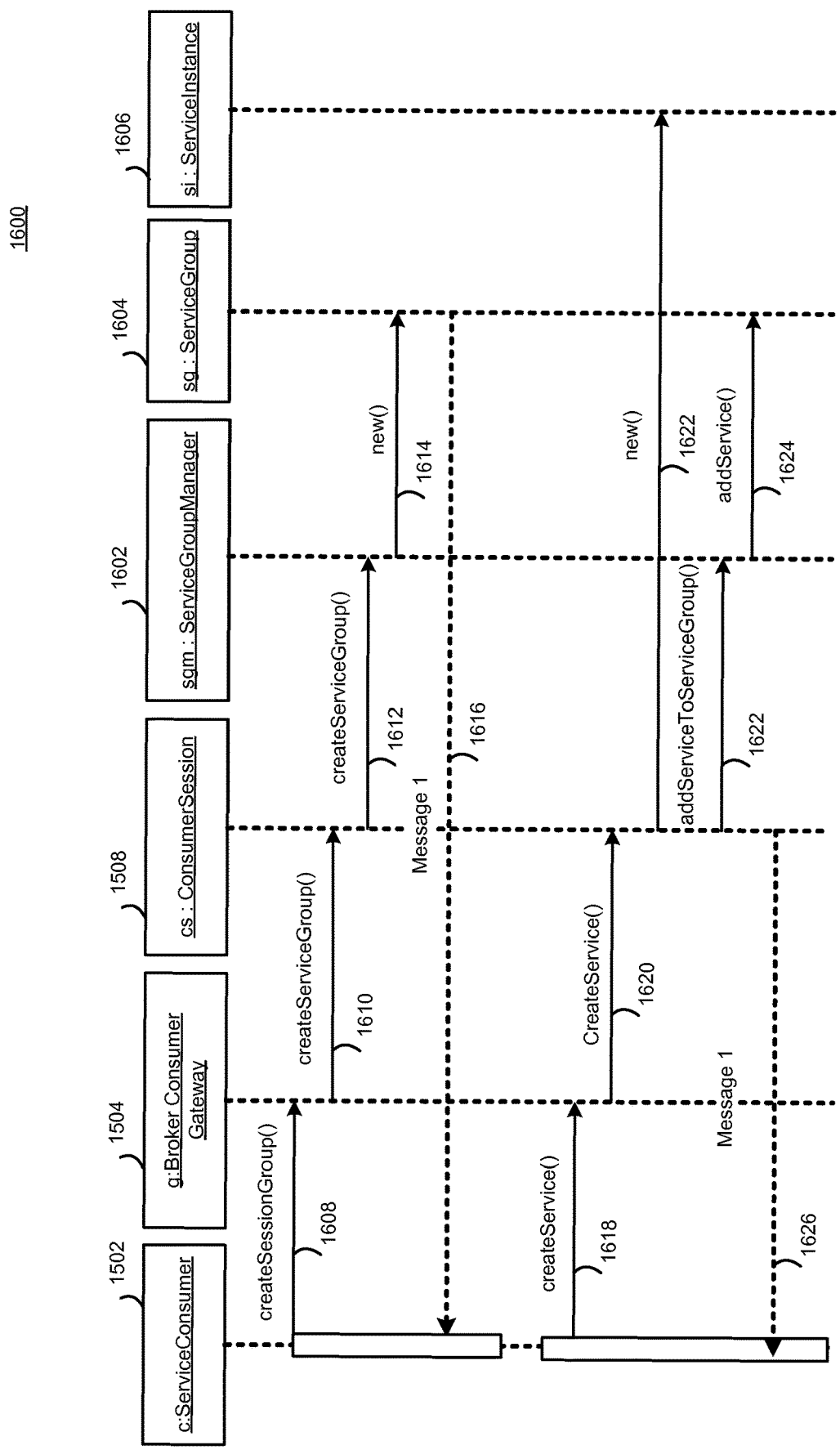
FIG. 16 is a sequence diagram illustrating a user request for a new service instance.

FIG. 16 is a sequence diagram 1600 illustrating a user request for a new service instance. As referenced above, Users/operators can anonymously request service instances, e.g., following either service discovery or direct service requests on consuming applications. No user identification/authentication need be required for this. The service instance may internally identify the user by asking for his/her name and other details, which may be considered as being outside of the service broker's authentication mechanism.

The UML sequence diagram 1600 for creating a new service instance for an anonymous user (directly by the self-serve user or an operator assisting the user) is assumed to occur after a consumer session has already been created, e.g., as shown in FIG. 15. In example of FIG. 16, no previous services have been requested, and therefore it is assumed that no service group is available for the user.

Then, a service group may be requested by the service consumer 1502 (1608). The request may be implicit, not explicit through the user/operator, since requested services may be contained in a service group even if unnamed. The request for creation of a service group is propagated by the broker consumer gateway 1504 to the consumer session 1508 (1610), which has been created as shown in FIG. 15. The consumer session 1508 then requests a creation of a service group from the service group manager 1602 (1612). Service group managers may be assumed to pre-exist, in this example scenario, and are thus available as factories for creating service groups.

The service group manager 1602 creates a temporary (unnamed) service group 1604 to implicitly contain service instances for the anonymous user/operator (1614). If further services are requested, they are contained in this service group. A maximum of one temporary service group may be created per consumer session, per a single user. In this example, once the consumer session ends, the service group will be deleted, deleting the service instances contained in it, even if they have not completed execution. To save the service instances, the user may identify himself/herself to a sufficient level so that the service group can be associated with that identity, for use in a subsequent consumer session.

The service instance is then requested through the service consumer and broker consumer gateway, respectively (1618, 1620). The consumer session 1508 processes the request by constructing a new service instance (1622). The consumer session 1508 requests the service instance 1606 be added to the service group 1604 through the service group manager 1602 (1623). The service group manager 1602 adds the service instance 1606 to the temporary service group 1604 (1624). Afterwards, the user/operator can interact with the service instance 1606 (e.g., messages 1616, 1626).

Figure 17:
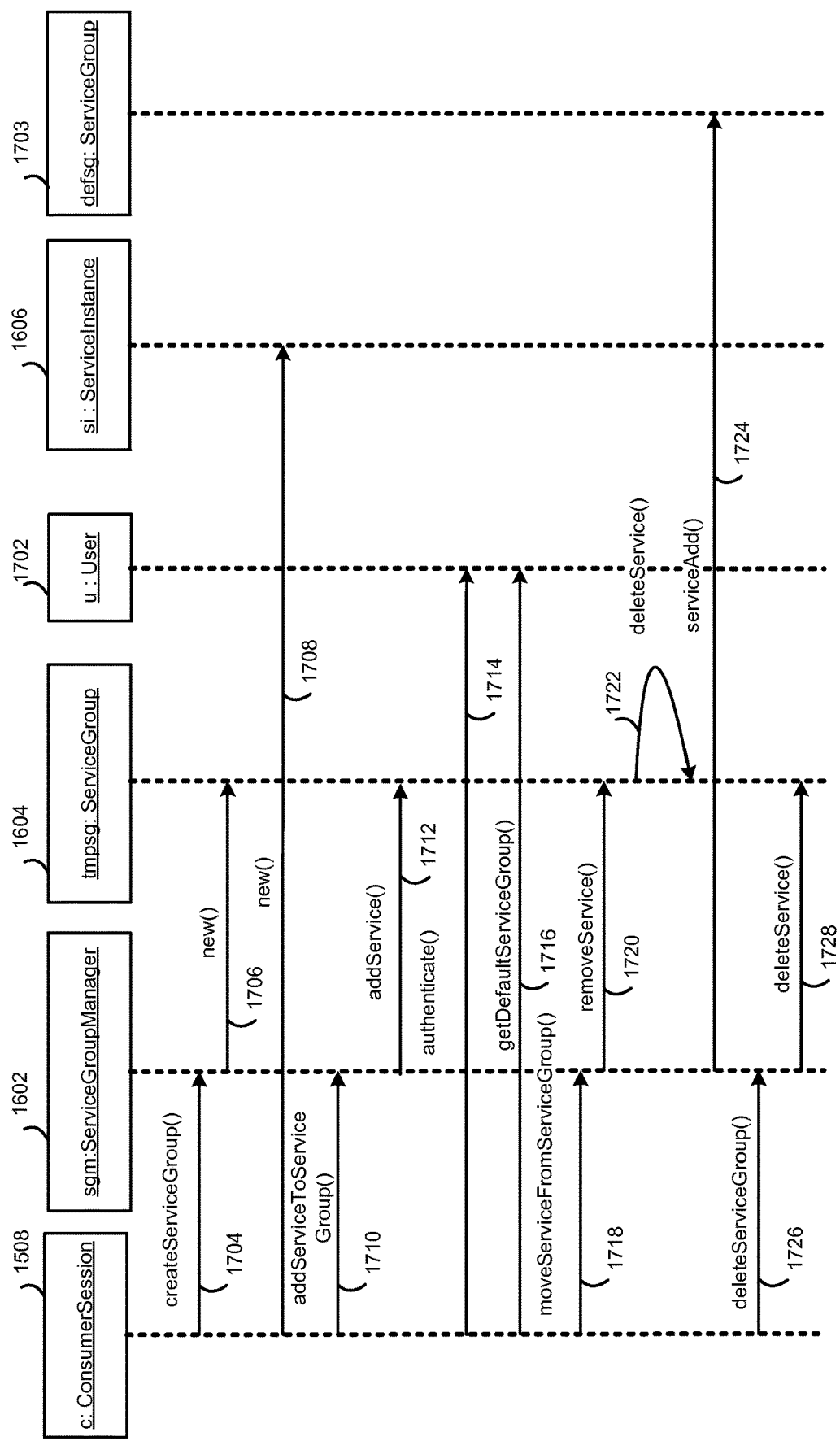
FIG. 17 is a sequence diagram illustrating service instances requiring user authentication.

FIG. 17 is a sequence diagram 1700 illustrating service instances requiring user authentication. Following from the scenario of FIG. 16, the example of FIG. 17 illustrates how a new service request may be processed, where the user needs to be authenticated. Authentication may be required when a service step is being used or a new service is requested, which has increased security sensitivity. For example, anonymous users can request travel informational services about available tourist attractions and services, however, once a booking is requested, the user may need to be identified. Thus, the sequence diagram 1700 of FIG. 17 illustrates creation of a new service instance for an anonymous user/operator, as a mid-consumer-session interaction.

In the example interaction, user authentication is needed, after which all the service instances that were created anonymously into the temporary service groups of the user object 1702 are transferred into an explicitly named service group 1703. This is so that, for example, those service instances can be persisted and accessed at a later date for the user. The transactions are moved from the temporary service group into the user's newly created and now (automatic) default service group.

Thus, it is assumed that a service request has arisen through the consumer session 1508 from an anonymous user. A temporary service group 1604 is requested from the consumer session 1508 to the service group manager 1602 (1704). The service group manager 1602 constructs a temporary service group 1604 (1706). A service instance 1606 is created through the consumer session 1508 (1708). A request for the service instance 1606 to be added to the service group 1604 is requested by the consumer session 1508 to the service group manager 1602 (1710). The service group manager 1602 adds the service instance 1606 to the service group 1604 (1712).

The need for user authentication arises because a service interaction of the service instance 1606, created in the consumer session 1508, requires the authentication. Requests for new services may also require authentication (not illustrated in FIG. 17). The user is authenticated (1714). The consumer session 1508 is no longer anonymous and now has access to the user object 1702.

The consumer session 1508 locates user's default service group (1716), and the consumer session 1508 requests the service instance 1606 be moved from the temporary service group 1504 into the user's default service group 1703, to the service group manager 1602 (1718).

The service group manager 1602 affects the removal of the service instance 1606 from the temporary service group 1604 (1720). The service group 1604 deletes the service instance (association thereto) (1722). The service group manager 1602 adds the service instance to the user's default service group 1703 (1724). The previous three operations (1720, 1722, 1724) may be repeated for all the service instances that were created when the user was anonymous. Finally, the temporary service group 1604 is destroyed through a consumer session request and service group manager action respectively (1726, 1728).

Figure 18:
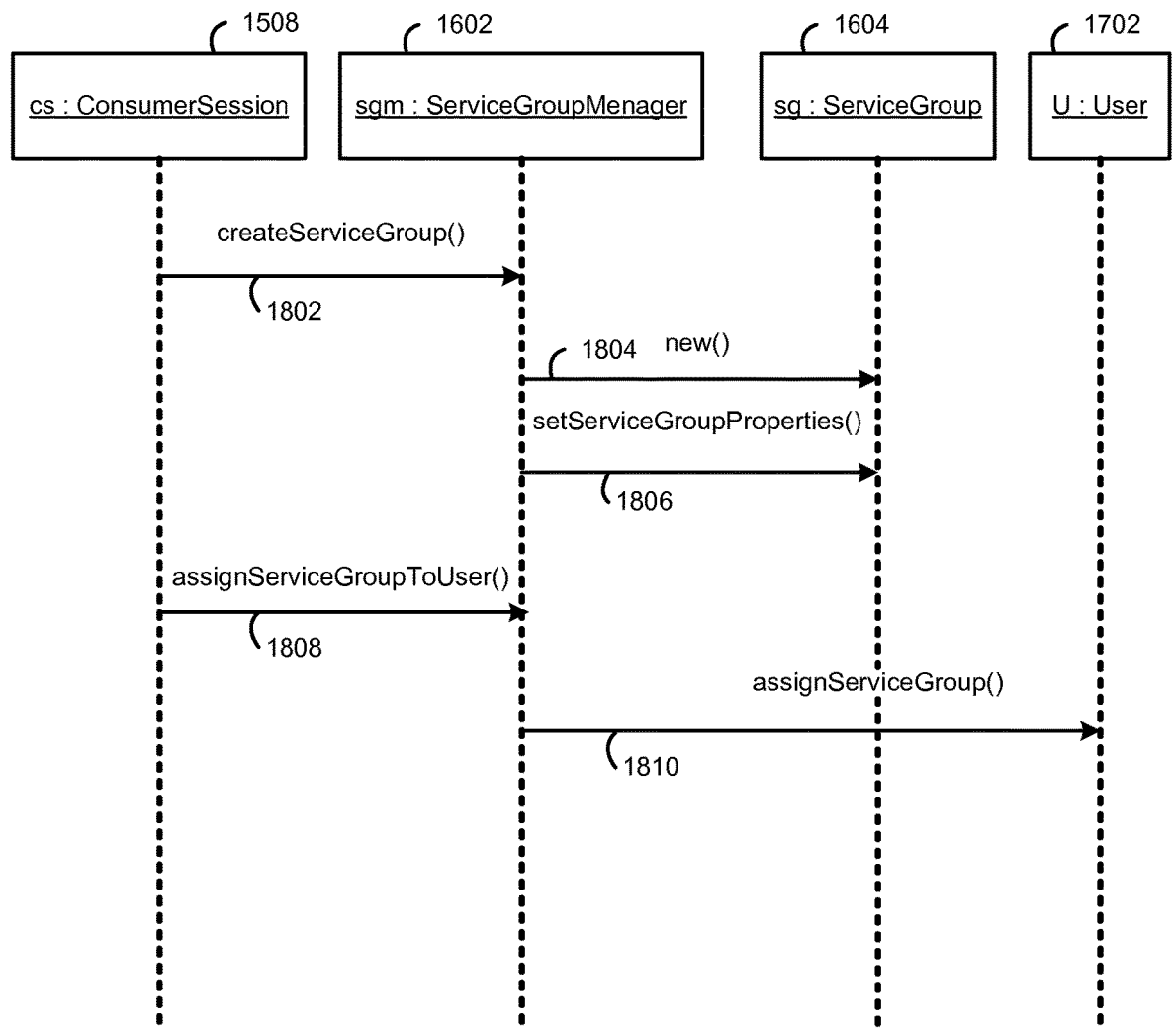
FIG. 18 is a sequence diagram illustrating addition of new service groups for authenticated users.

FIG. 18 is a sequence diagram 1800 illustrating addition of new service groups for authenticated users. Specifically, continuing the example of FIG. 17, the example of FIG. 18 illustrates how new service groups can be added, where the user has been authenticated. New service groups would be required, for instance, when service bundles are ordered after previous services and possibly other bundles have been requested.

The new service group may be created, as previously described with respect to FIG. 17 (1802, 1804). The user optionally assigns a name to the service group for easy reference (1806). The consumer session 1508 requests assignment of the service group 1604 to the user object 1702, to the service group manager (1808). Then, the service group manager carries out the assignment (1810).

Figure 19:
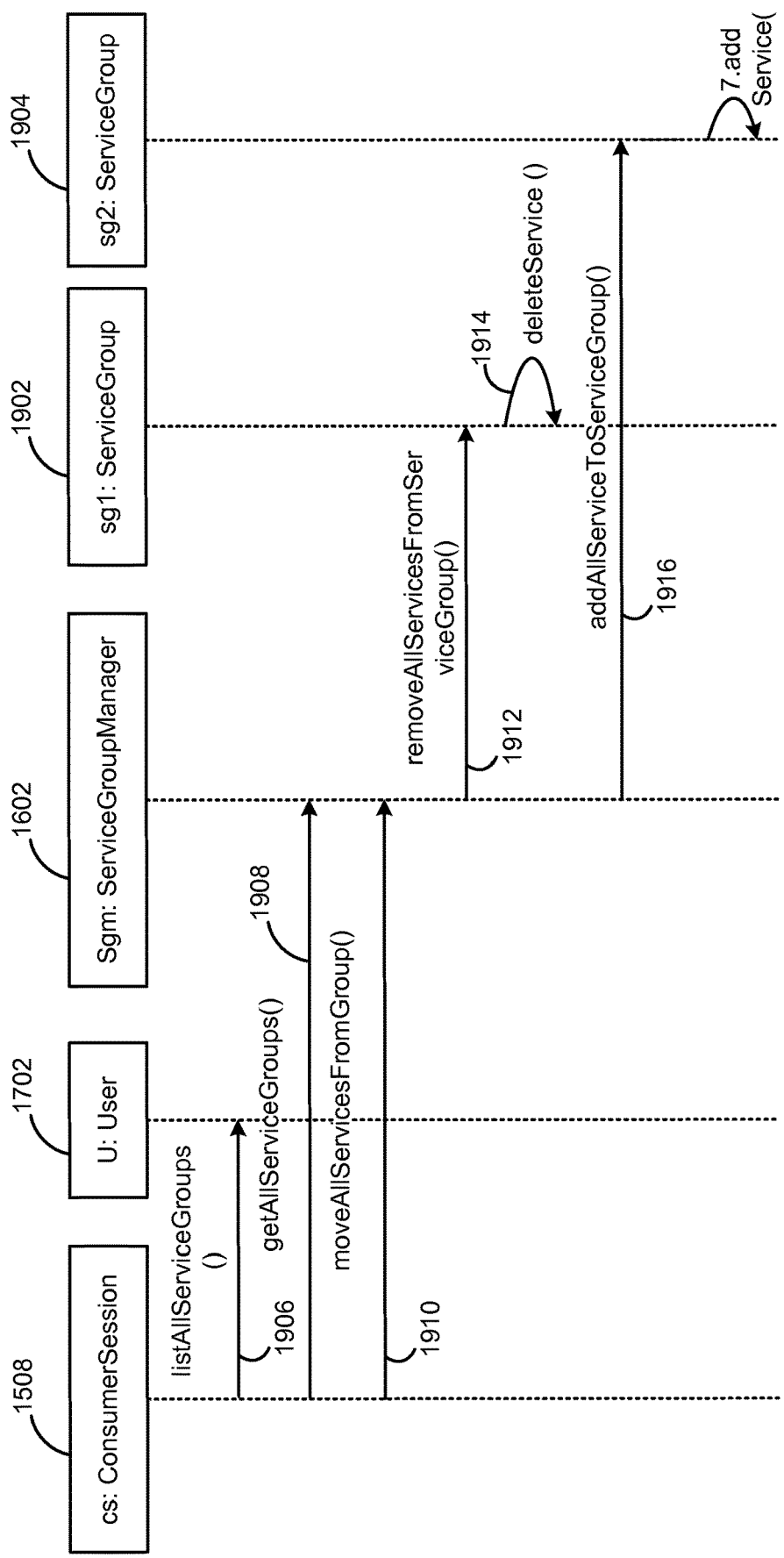
FIG. 19 is a sequence diagram illustrating movement of service instances between service groups.

FIG. 19 is a sequence diagram 1900 illustrating movement of service instances between service groups. That is, given that there can be several services and groups for users, accessed through several consumer sessions, users may wish to reorganise different service instances into different service groups. This is especially useful in situations interactions with services leading to further service referrals, or further requests for service bundles. As more and more services are ordered, users may need to reorganise services within different groups.

The existing service groups for the user are identified and accessed through requests from the consumer session 1508 to the user object 1702 and service group manager, respectively (1906, 1908). The consumer session 1508 requests the move of services of one service group 1902 to another service group 1904, through the service group manager 1602 (1910).

The service group manager 1602 starts by removing all service instances from the source service group (1912). The source service group 1902, in turn, deletes each of its service instances (deleting the associations to itself only) (1914). The service group manager 1602 then adds all service instances to the target service group 1904 (1916). Each service instance is then associated with the service group 1904 (1916).

Figure 20:
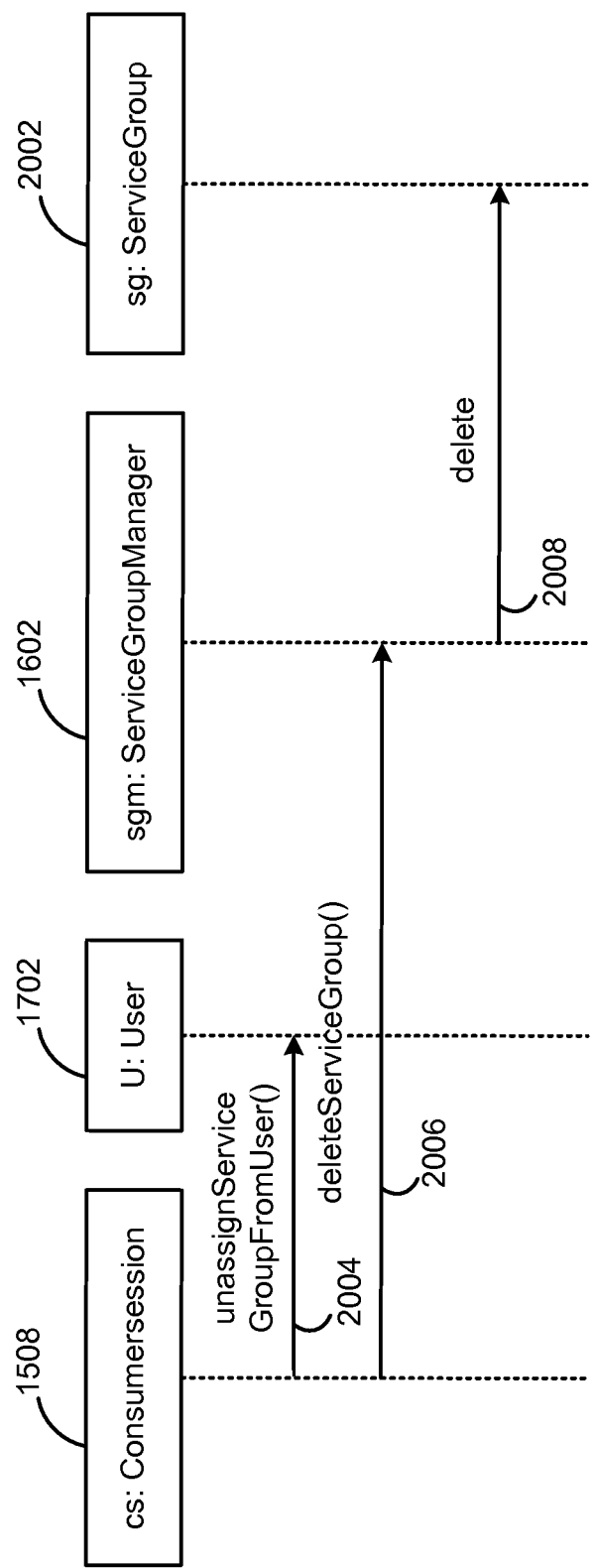
FIG. 20 is a sequence diagram illustrating deletion of an empty service group.

FIG. 20 is a sequence diagram 2000 illustrating deletion of an empty service group. Service groups may be deleted when they are empty or when they contain service instances whose executions have reached completion. Users may initiate deletions of service groups, although there may also be example scenarios in which the service broker initiates system wide "clean-ups" including deletions of empty service groups.

The consumer session 1508 initiates the unassignment of the service group 1604 from those owned by the user (2004). Since service groups (other than the temporary ones) are always assigned to a user, unassigning it from a user will also cause it to be deleted. The consumer session 1508 requests deletion of the service group to the service group manager 1602 (2006). Then, the service group manager 1602 deletes the service group 1602 (2008). As part of this operation, a check may be made to determine that the service group 1604 is empty.

Figure 21:
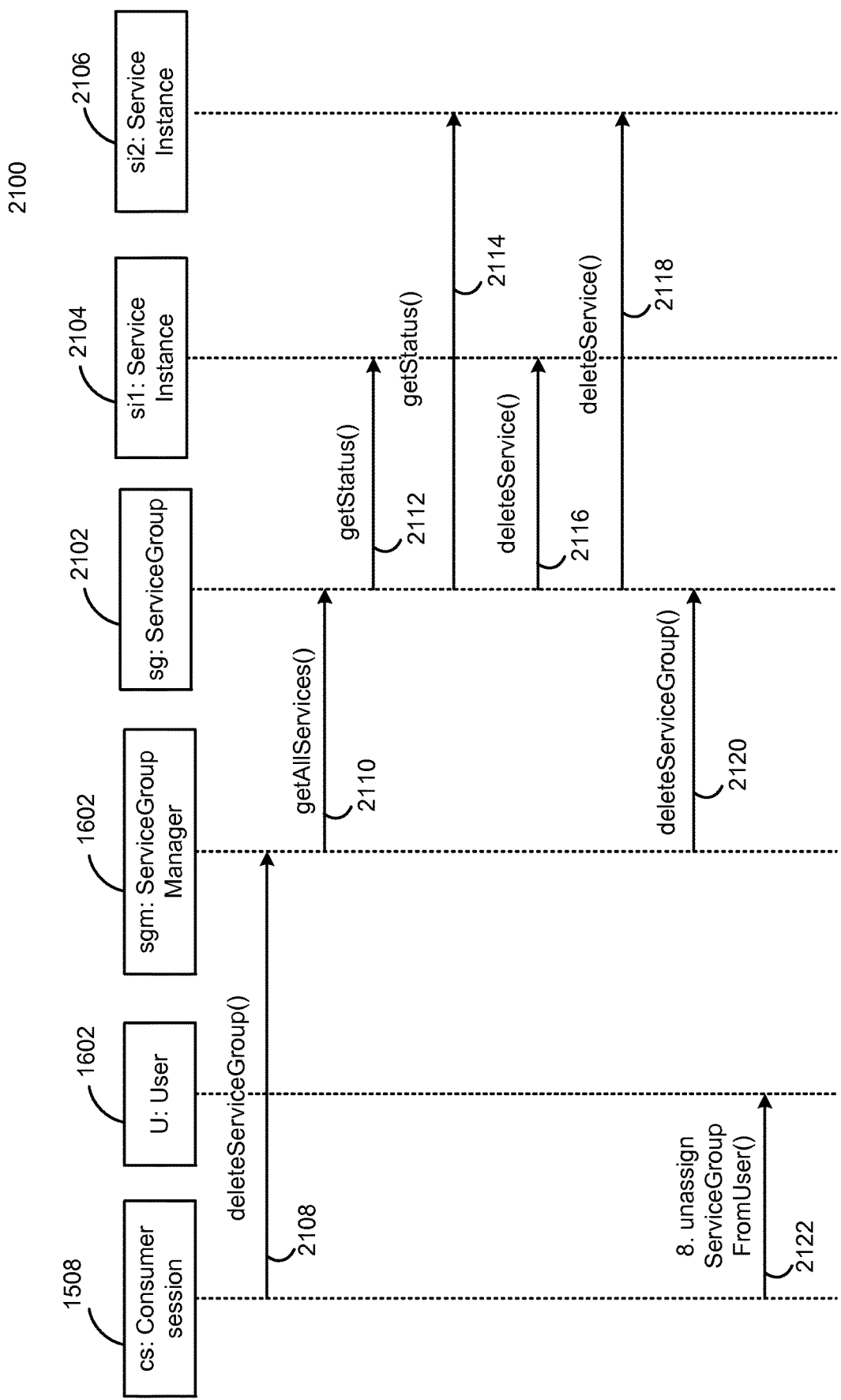
FIG. 21 is a sequence diagram illustrating deletion of a non-empty service group.

FIG. 21 is a sequence diagram 2100 illustrating deletion of a non-empty service group. That is, another example scenario is illustrated for deleting service groups is when the service groups are non-empty and contain service instances whose executions have reached completion.

In the particular example of FIG. 21, the service group 2102 contains two service instances 2104, 2106. The consumer session 1508 requests removal of the service group 2102 to the service group manager 1602 (2108). The service group manager gets all the service instances in the service group to check whether deletion can permissibly occur (2110).

The service group 2102 checks the first service instance 2104 to see if it can be deleted (2112). If it cannot be deleted, the entire delete service group operation may fail. Similarly, the service group 2102 checks the second service instance 2106 to see if it can be deleted (2114). The service group 2102 deletes the first service instance 2104 (2116). The service group 2102 then deletes the second service instance 2106 (2118). The service group manager 1602 deletes the (now) empty service group 2102 (2120). Finally, the consumer session 1508 unassigns the service group 1602 from the user object 1602 (2122).

Figure 22:
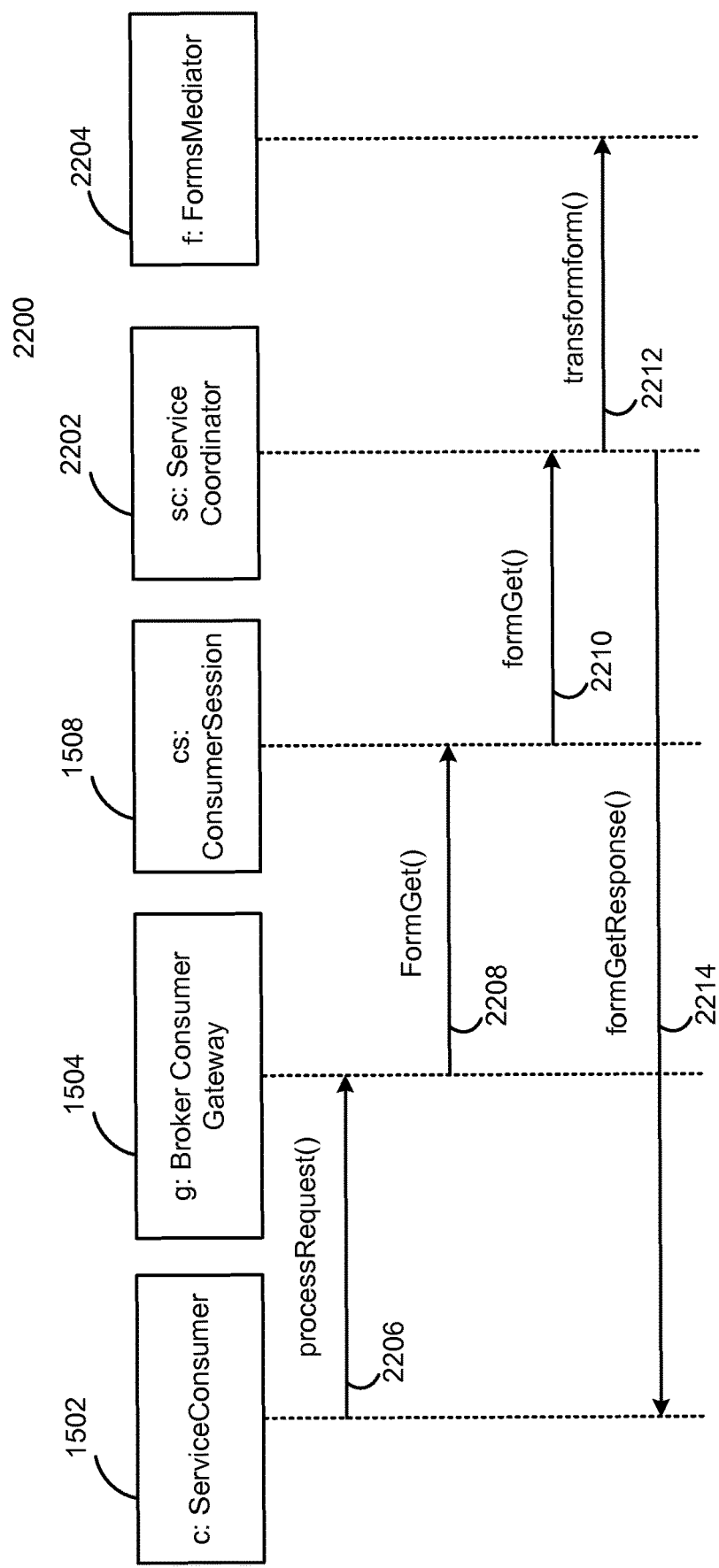
FIG. 22 is a sequence diagram illustrating interactions with service instances.

FIG. 22 is a sequence diagram 2200 illustrating interactions with service instances. That is, the details of interacting with service instances, from requests for service actions initiated through consuming applications, mediation through the service broker, and invocation of operations on backend service applications in hosted environments, is contemplated in the following description. For the sake of example, it is assumed that a service has been discovered, ordered, and is available for interactions, through the creation of a service instance and its corresponding support classes like a service coordinator, as described above). In the example of FIG. 22, a service instance is requested either directly through a consuming application or following service discovery through which the user selects the service.

In FIG. 22, the service consumer 1502 passes the request for creation of a service instance through the broker consumer gateway 1504 (2206). Alternatively, the more general processRequest( ) method may be invoked with parameters for the requested service passed through the RequestDetails message. The broker consumer gateway 1504 propagates the request to the consumer session (2208). The consumer session 1508 constructs a new service instance using the supplied parameters (2210).

The service instance creates its support classes (2212, 2214); e.g., a service coordinator 2202 for determining and tracking the sequence of service execution steps, a forms mediator 2204 for transforming forms represented in a technical channel/device independent way into a technical channel/device specific way, and a service mediator which binds concrete adaptors required by a service broker for communicating with backend service applications for that specific service instance.

Once a service instance has been created, and is allocated to a service group, it can be interacted with through a consuming application. From a consumer-oriented perspective, services are interacted with through individual steps involving artefacts of service presentation for the steps, or forms. Forms represent a collection of data fields. The processing of each step involves determining what form is needed so that the user can fill in data and select an action, submit information corresponding to it and obtain a response (e.g., validation that the data that has been entered, or performing the requested action).

In this regard, the required functionality for forms and action requests/submits may correspond to a single transition of the coordination model. Accordingly, each transition's logical action is itself captured through a state machine, as depicted by way of example in FIG. 23.

Figure 23:
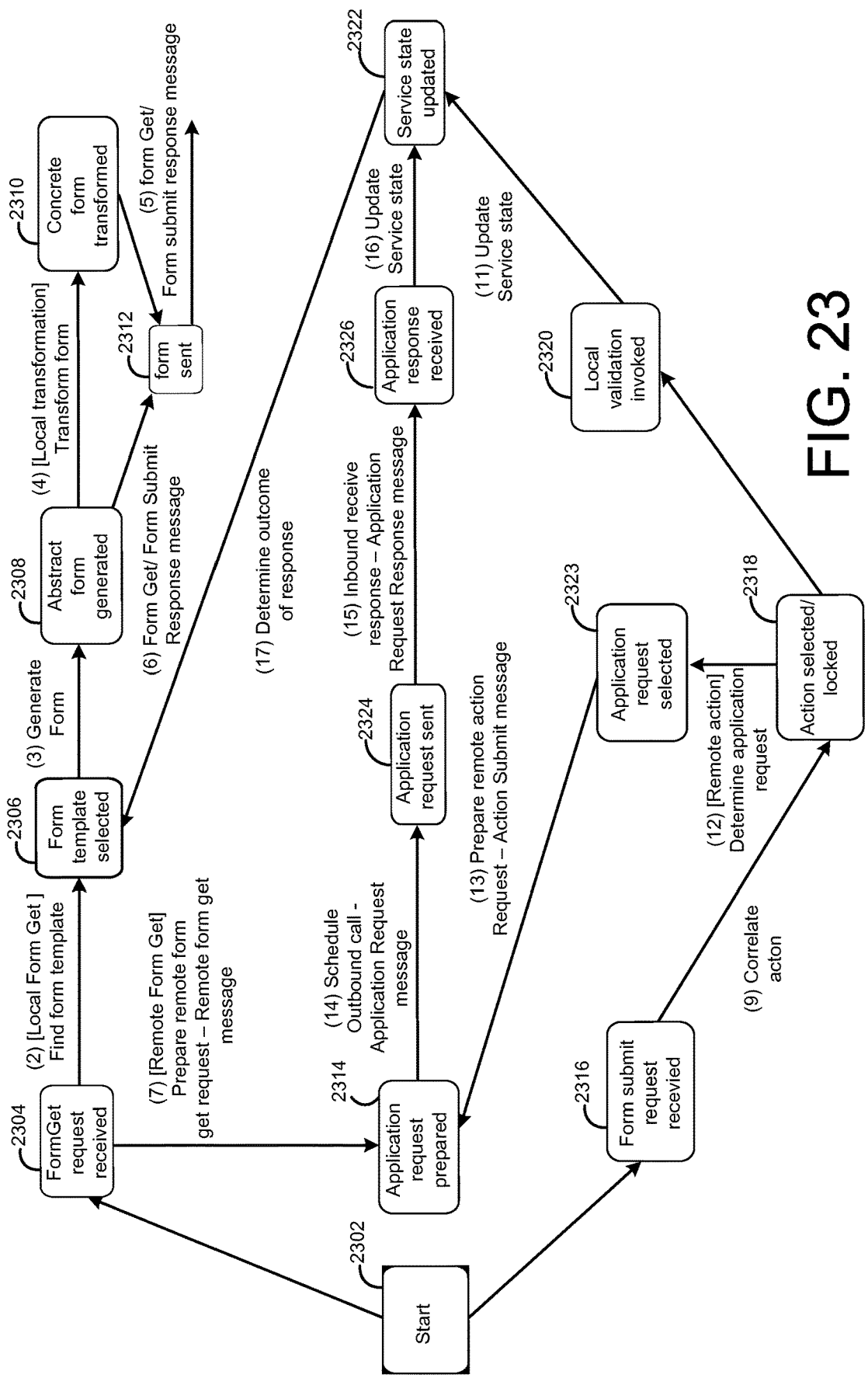
FIG. 23 illustrates a block diagram for processing consumer interactions.

Specifically, FIG. 23 illustrates a block diagram for processing consumer interactions. Example details of the how a coordination model 2300 is used to orchestrate the execution steps of a service are detailed below.

Figure 24:
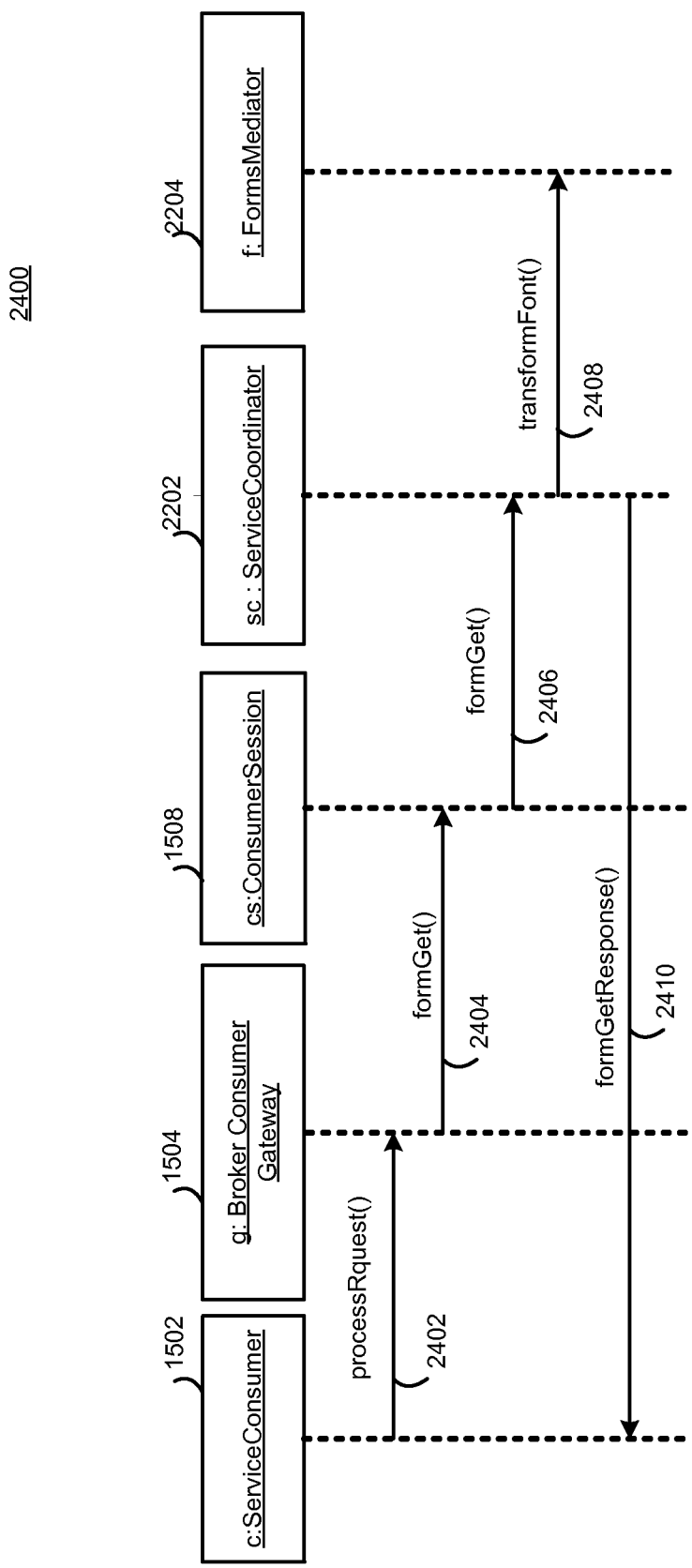
FIG. 24 is a sequence diagram illustrating techniques for obtaining forms for user interactions.

As referenced above, user interactions are conducted using forms which correspond to states of a coordination model used to deliver a service. The forms may be obtained when a service is accessed for the first time in a consumer session. This may be the first time a service instance is ever accessed, or the first time since the last session that the service was accessed. FIG. 24 is a sequence diagram illustrating techniques for obtaining forms for user interactions, and is also referenced hereinbelow in the discussion of FIG. 23.

The example of FIG. 23 illustrates details of processing requests to get forms as discussed in terms of the Coordination Model 2300. In FIG. 23, associated transitions between states are enumerated, as shown and described.

As shown, a transition (1) from a start state 2302 may include receiving a request to obtain a form at state 2304. This may lead to a transition (2) of executing a local FormGet action (i.e., local to the service consumer object) to find a corresponding form template (2), which leads to a state 2306 in which the form template is selected. A transition (3) for generating the form leads to a state 2308 in which an abstract version of the form is generated. A transition (4) executes a transformation of the form into a channel-specific version, which leads to a state 2310 in which the concrete form has been transformed. A transition (6) executes preparation of a response message for responding to the (in this case) form get request. Then, as shown, a state 2312 may be reached in which the form has been sent, including a transition (5) in which an appropriate response message is sent.

In another example, the initial form get request may be received at the state 2304, and executed through transition (7) as a Remote Form Get procedure which thus results in a state 2314 in which an application request is prepared, as described in more detail below in the context of receiving a form submit request. Specifically, a transition (8) may correspond to receipt of a submitted form and a state 2316 in which the request for Form Submit is received. An action correlated to the submitted form may be determined in a transition (9), which leads to a state 2318 in which the correlated action is selected and/or locked (e.g., to avoid deadlock with related application operations of the same or different application services).

If a local action is available in transition (10), then a state 2320 in which local validation is invoked may be reached (e.g., local validation of a zip code or other static information). Then, a transition 11 may update the service state to reach a state 2322 in which the service state is updated. At this point, a transition (17) determines an outcome of a response to the submitted form, which leads back to the state 2306 in which a form template for a form for rendering the outcome of the response is obtained, so that states 2308, 2310, and 2312 may be reached as described above.

On the other hand, if local validation is not available for the selected/locked action after the state 2318, then a remote application request may be determined in transition (12) and a state 2323 may be reached in which the appropriate application request is selected. Transition (13) prepares an action submit message for a remote action request, to reach a state 2314 in which the application request is prepared.

As shown, the state 2314 thus corresponds either to a state in which a remote form get request has been received, or a state in which a remote action request has been received. In either case, a transition (14) may proceed in which an outbound call is scheduled and an application request message is sent to reach a state 2324. In transition (15), the response to the application request is received to reach a state 2326. A transition (16) updates the service status to reach the state 2322, which, as described above, leads back to generation and transmission of the appropriate form (2306-2312).

In more detail, and mirroring portions of this processes of the coordination model 2300 in the sequence diagram of FIG. 24, the service consumer object 1502 executing in the consumption environment, responsible for interacting with the service broker consumer gateway 1504, requests a form through a formGet( ) call, which generates an (XML) FormGet request message (2402). The formGet( ) call is propagated through the broker consumer gateway 1504, consumer session 1508, and Service Coordinator 2202 of the service instance (2404, 2406).

As referenced above, a form may be retrieved either locally through the Service Coordinator or remotely through the hosted environment of the service. In the case of local retrieval, the form is selected from the coordination model by the service coordinator 2202. A form may be associated with each state (except, e.g., the terminating state). To obtain the form, the corresponding form template is selected for the current service state, as described above.

The form may be generated using the form template and the associated data state (expressed as an array of variables) and the forms mediator 2204. The forms mediator 2204 uses as input the form template and the technical channel type of the user (e.g., passed through the formGet( ) request message from the service consumer object). The forms mediator 2204 creates a FormGet response message to be returned to the service consumer. The FormGet message is an instantiation of the forms template. It contains the forms filled in using data variables from the data state. Form templates may map to individual forms and data state variables in a desired manner. The technical channel is used to transform the forms for display of the device of the user.

The service xoordinator can translate the form into a format suitable for display on technical channel type (2408) before sending the form to the service consumer (2410). As referenced above, there may be a local transformation, transformForm( ). Alternatively, the service consumer may execute such a translation once sent the abstract representation of the form has been created. Either way, the forms mediator passes the FormGet response message back to the Service Coordinator and the service coordinator 2202 sends this message to the service consumer 1502, accordingly updating the coordination model 2300 (e.g., the formGet-Response( ) call of FIG. 23).

The service consumer 1502 then retrieves the forms to be displayed from the FormGet response message and does the channel-specific transformation if required to do so. When a form is displayed by the service consumer 1502, further notifications can arrive from a service coordinator due to ongoing data notifications which can be presented on the form. Therefore, in such a state of the coordination model, "silent" transitions can occur to allow for one-way notifications. States which allow "silent" transitions may be configured accordingly to indicate this. The service coordinator will not generate new FormGet response messages but will send InForm notification messages which will be rendered onto the existing form that is displayed.

As described, an alternative to local forms retrieval is remote forms retrieval from the hosted environment. For this, a remote FormGet request message may be prepared, as shown in FIG. 23. The remaining steps for processing remote form requests follow action submission requests to hosted environments as described below. Once the form has been obtained, the steps to send the response to the service consumer are as described above (2308-2312). One reason for retrieving a form template is because the representation of the forms of a channelled service may be different than those of the hosted environment, e.g. the presentation order of fields and advertising may be configured as part of a (channelled) service.

Figure 25:
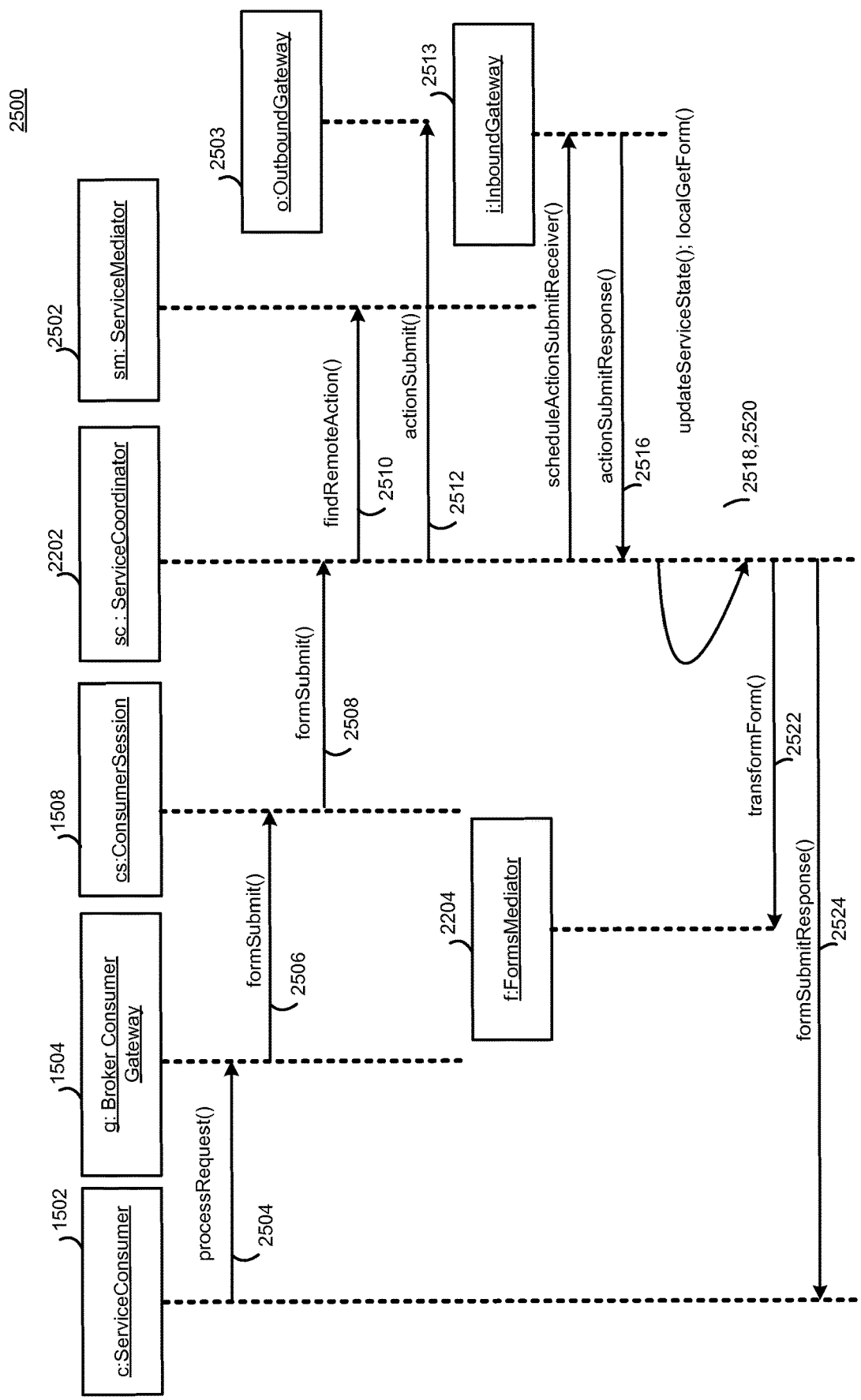
FIG. 25 is a sequence diagram illustrating form submission and related actions.

FIG. 25 is a sequence diagram illustrating form submission and related actions. In FIG. 25, reference is also made to related transitions and states of FIG. 23. In general, as already described, forms are submitted after users have filled in forms and requested actions. FIG. 25 thus shows which objects are invoked for getting forms.

In FIG. 25, a filled form(s) and the requested action by the user is submitted through a formSubmit( ) call from the service consumer to the service coordinator 2202, involving a formSubmit request message (associated with state 2316). This occurs, e.g., when the user has filled in a form and selected an action of the form. The user completes a form interaction step and signifies a request for an action on a service. The action to be undertaken is determined through the submitted form. As illustrated in FIG. 12, different actions may be associated with a particular state (e.g. "State m" 1204 has "Action x" and "Action y" 1204a, 1204b). A FormSubmit request message generated by the service consumer contains the filled in form(s), the requested action and the technical channel type through which the user has requested the action.

The generic processRequest( ) call is propagated through the broker consumer gateway 1504 (2504) as formSubmit( ) to the consumer session (2506) and service coordinator (of the service instance) (2508). The service coordinator checks that the requested action correlates to the allowable actions of the current state from the Coordination Model 2300, as shown in transition (9) to the state 2318 as described above. The allowable actions are those which relate the outgoing transitions of the coordination model. If allowed the service coordinator 2202 locks the current state and selects the requested action's operation(s). Details of operations for requested actions are stored as part of the coordination model. More than one operation is allowed, potentially to more than one service (since a brokered service may support delivery for more than one service).

As described, the action may be executed remotely at an agency or locally. This information may be made implicit in the configuration information of operations in the coordination model. If the operation is executed locally, a corresponding interface may be made available, locally, for a corresponding operation to be executed. The local action operation is executed and the state of the service needs to be updated, as shown in transitions (11), (12), for states 2320, 2322 of FIG. 23. After this, the result of the execution may be determined, as described (transition (17) to the state 2306), followed by communicating the outcome to the user, as also described (states 2306 -2312 and associated transitions).

The execution of a remote operation may require the determination of a remote action operation (2510), with reference to the transition (12) to the state 2323 of FIG. 23, as well as the corresponding creation of an ActionSubmit request message 2512 adapted with supplied input parameters, with reference to the transition (13) to the state 2314 in FIG. 23. A local service mediator 2502 may be used for this purpose.

Then, an outbound service of the inbound/outbound gateways 2503, 2513 of the service broker may encapsulate a RemoteFormGet (for a remote form get requests) or Action-Submit request (for a remote action request) message (e.g., 2512 in FIG. 25). It also may factor in messaging quality of service parameters required for an application request due to the different qualities of connection and communication requirements with hosted environments and backend applications.

The Outbound service schedules a messaging action for the ApplicationRequest request message, which may include sending and logging of details about the ApplicationRequest message, as in the transition (14) to the state 2324. The outbound service communicates with an Inbound/Outbound gateway 2503, 2513 located at the hosted environment of the service. When the service application responds, the Inbound/Outbound gateway 2503, 2513 does the necessary message encoding and sends it back to the service broker's Inbound/Outbound gateway using an Inbound service.

The Inbound service receives an ApplicationRequest response message and logs receipt of it, as in the transition (15) to the state 2326 in FIG. 23. The inbound service passes the message to the service coordinator 2202. The service coordinator 2202 updates the state of service using data from the message, as shown in the transition (16) to the state 2322 of FIG. 23.

The response from the service application may entail different outcomes. For example, each transition from a state is associated with an action and response. For example, the response for a booking request may be to accept the request, to reject the request because the reservation time has elapsed, or the request may simply have timed out during communication with the service application. Whether remote execution (2510/2512) or local execution (2514-2520) is applied, the service coordinator 2202 determines which outcome results. The outcome is matched against the different transitions of the state associated with the action, and a transition is triggered. When a transition is matched, the service coordinator releases the current state and sets the current state as the one which is the target of the selected transition. Depending on a result a Service Coordinator can: change state, not change the state (because an error occurred) and re-issue the request (or an alternate request), or not change the state (because an error occurred) and not re-issue the request (or an alternate request).

The result of the outcome may to be communicated to the user (2522, 2524), as described above with respect to transitions (3)-(6) and states 2306 to 2312 of FIG. 23. It is possible that notifications may also be sent from applications. These can be considered as streaming responses, which are allowed as part of the single outcome (and thus transition). In other words, in such examples, notifications need not change the state of a service.

Figure 26:
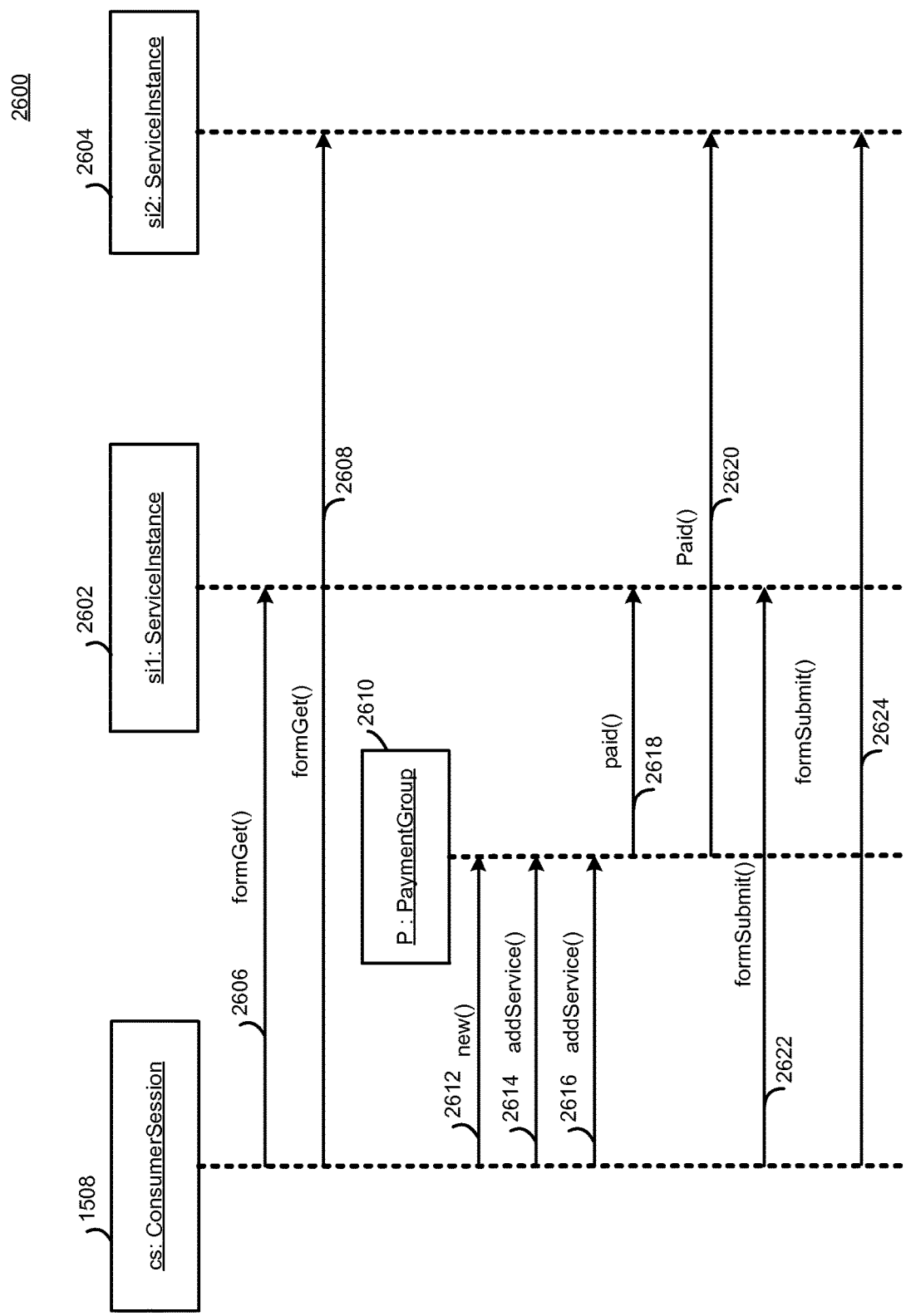
FIG. 26 is a sequence diagram illustrating examples in which payment for services is handled for multiple service instances collectively.

FIG. 26 is a sequence diagram illustrating examples in which payment for services is handled for multiple service instances (2602, 2604) collectively. In this regard, as referenced above, payment conditions of services may apply to different steps of services. Payment handling may be managed for one or more service instances using payment groups. The service instances may be assigned to the payment group and then the payment group can manage payments for these services. Payment actions (e.g., verify payment methods, make partial payments, make full payments) can be performed individually on the services or collectively.

In FIG. 26, the form for the first service instance 2602 is obtained (2606). The consumer session discovers that this is the transactional stage and identifies the price that is required. Then, the form for the second service instance 2604 is obtained (2608). The consumer session also discovers that this is the transactional stage and identifies the price that is required.

A payment group 2610 is created (2612). The broker would generally have collected payment before allowing for the next steps of the two services to proceed. Then, the first service instance 2602 is placed in the payment group (2614), and then the second service instance 2604 is placed in the payment group (2616). The payment group indicates to the first service instance 2602 that it has been paid for (2618), and indicates to the second service instance 2604 that it has been paid for (2620). Then, the next step for the first service instance 2602 is completed (2622) and then the next step for the second service instance 2604 is completed (2624).

Compensation situations may occur when a service fails after payment has been collected. For example, this may occur when the formSubmit (the one called after payment has been received) fails. This failure may occur despite checks carried out before payment was collected. For example, the parameters in the formSubmit may be incorrect. Alternatively, the purchase may become unavailable, such as when, another customer has taken the item while the payment was being collected.

In these situations, the broker refunds the money collected and initiates the compensation sequence. If the broker is responsible for payment collection, then it will generally also be responsible for refunds. The mechanism for refund may be defined through the service deployed by the service provider.

The compensation sequence may include the consumer session indicating to the payment group which service instance has been refunded. Then, the payment group may indicate to the service instance that it is no longer paid for and the service coordinator updates its coordination model accordingly. These two steps may be repeated for all the service instances that failed and are refunded. Service instances in the payment group can be refunded individually and do not have to be refunded as a whole. Some of the service instances can remain paid.

In a specific example of some of the various implementations described above, a scenario may be considered in which a one-stop citizens/constituent service broker (as an example of the service broker 104) is created to simplify access to a large number of services from government agencies and private sector stakeholders. A number of channels link to the broker, providing a variety of applications which allow for general search/discovery/access to services published through the broker or targeted access of specific services. These channels are government agency-specific, whole-of-government or from the private sector. Services published by providers are mostly commoditized so that they can apply a potentially open-ended set of channels. One particular offering is business formation which is required for business entities, including obtaining a business license, before they conduct interactions with people and other entities in the surrounding environments.

To obtain a business license, an applicant needs to meet the obligations, including payments, associated with license provisions (e.g. workplace health and safety, liquor). These are regulated through different agencies in the Public Sector.

In the past, the Public Sector required applicants to obtain the different provisions separately, through interactions with the different agencies. Each agency, in turn, has requirements (e.g. transportation, telecommunications, environmental) which need to be satisfied before the provision is granted. Some of these requirements entail interactions with other agencies, public or private (e.g. transportation, telecommunications and environmental authorities).

In order to streamline the lengthy process (lasting months and potentially years), a service broker as described herein may be implemented. Then, during operation, when the service is selected, the license applicant is identified (name and contact details). The residential status of the applicant is verified through Public sector jurisdiction services to limit creation of license types to particular statuses. A number of checks are executed to identify which business license type is required. For a given set of checks navigated by the prospective owner, one or more license types are listed and a choice is made.

For a given choice, different provisions for the license type are identified. For each provision, interactions with license provision services are initiated. The interactions involve a number of cycles with the applicant: requirements clauses are stipulated through the service; responses including supportive documentation and links to fulfilled services for each clause are provided by the applicant; assessments of supplied information are made and sent to the applicant; and so on, until the requirements are considered fulfilled or not fulfilled. Dates of interactions and dependencies between clauses are captured, including new clauses that may arise out of the interactions. The business license application form for the business license can be generated at any stage.

Once all clauses of all provisions have been satisfied, the service broker may move the brokered service into a pre-settlement phase. The total payment for the license type (allocated to different agencies for provisions of licenses) are obtained, and other conditions of settlement are notified. The applicant stipulates conditions of settlement (pick-up of documents and materials) and makes the payment. Once the conditions of settlement have been stipulated and payment has been made, the service moves into a settlement phase.

The above process describes business formation from a regulatory point of view. With further insights into the needs of consumers and adjacent markets, otherwise regulatory services can be extended for greater customer convenience and relevance. One line of service aggregation relates to how the market for business formation could be widened without changing the service. By allowing for business opportunities to be searched, not only are applicants who have made the decision to open up a business supported, but so are those seeking the market opportunities in the first place.

To extend an otherwise regulatory service to economic benefit, the following sorts of services may be included. For example, a service allowing publication of business opportunities (e.g. open shop leases), which may be collected in various ways, e.g., allowing users to register existing opportunities (as part of registration, details of the business opportunity are validated through invocation of further services), allowing users to register desired services (i.e. community-driven business identification), searching publicly available services known to contain opportunities (e.g. business leases soon to expire, vacant outlets in buildings), and allowing service providers to register specialist services for opportunity sensing (e.g. development projects for communities and buildings, complaints tracking of existing businesses, businesses in financial trouble). A map-based service may be provided which allows search of business opportunities based on geo-spatial contexts, business indexes, localities, demography etc.

Further, services lines that enable applicants to undertake feasibility analysis of specific businesses could include demographic analysis, land use, Environmental compliance, Local supply chains, subsidized support or incubation, financial viability, and financing options. Another avenue for value-adding arises from consideration of the service lifecycle. For instance, a major phase of the service is settlement, where the transaction and formal transfer of documents and materials to enact the business license are executed. Further services could be added prior to, during and after settlement—adding value to these without additional cost to the public sector.

Thus, the service broker 104 can be exploited by the Public Sector to allow a complex service bundling of business formation services to be created through third-parties who can access the broker's repository of services and quickly create the service bundles. In the first place, the contributing services from different agencies should also be published on the broker. Third-party BPO providers can be engaged for services to interact through particular messaging standards and communities, e.g. tax standards for interfacing the federal and state related taxation agencies. Cloud providers could be used to provide hosting for small businesses after they have obtained their licenses to operate. A variety of channels can exploit business formation service bundles, as alluded to above (government channels, private sector channels, community channels etc). Other examples and variations would be apparent.

The present description describes requirements and a logical design specification for a dedicated run-time component of platforms providing service delivery in service network applications, such as, e.g., service marketplaces and business service network directories. Service delivery management is positioned as the dedicated processing required after serviced are discovered, ordered and accessed through the service repositories of service networks. The nature of service delivery in this context varies from run-time of software components in conventional platforms such as application servers and middleware, business process management, and conventional service delivery platforms.

Thus, for allowing stateful, multi-step, long-running business services to be deployed, configured and executed through the service delivery manager, multi-channel service delivery, service instance management, and delivery configuration provide techniques for exposing a service coordination model which exposes the service steps to be orchestrated through the service broker. Arbitrary consuming applications (e.g., a variety of business and technical) may interact with the service broker in a way that minimizes their dependence on the broker's internal workings and the way services are architected to be orchestrated through the Broker. A coordination model allows services to orchestrated through the Broker for the purposes of service delivery, e.g., sending forms to consuming applications, receiving submitted forms containing actions for execution, adapting and invoking backend service applications and sending responses from backend applications to consumers including just-in-time forms transformations so that they can be presented in the technical channels that requests came through.

Further, services may be delivered in a wider context concerning users using services. Grouped access to services, differing levels of security for services, metering and payments/billing and usage history/auditing are enabled and provided. Such factors may imply that for services to be brokered, they need to interact with other delivery management components concerned with delivery considerations across services. These included consumer sessions which any number of services are accessed across multiple "login" sessions where user interactions on a session level are persisted, service groups (for supporting e-commerce shopping carts and service bundles) and payments groups (for integrated billing across different services).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions stored on a non-transitory computer-readable storage medium, the computer system comprising:
    a service regulator configured to cause at least one processor to transform a service interface of at least one service of at least one service provider into service states and transitions between the service states to create a coordination model, the service states corresponding to distinct forms to be exchange with a user as part of an execution of the at least one service, the transitions representing action requests and responses on the at least one service;
    a broker consumer gateway configured to cause the at least one processor to interface with a service consumer of a computing device consuming the at least one service of the at least one service provider based on the coordination model, each of the service states represented as at least one distinct form that is requested, filled-in, and submitted in association with the user via the service consumer of the computing device; and
    a service delivery manager configured to cause the at least one processor to mediate delivery of each of the service states modeled with the coordination model of the at least one service to the service consumer of the computing device via the broker consumer gateway including invoking the at least one distinct form for each of the service states during execution of the at least one service, the service delivery manager including:
        a consumer session manager configured to cause the at least one processor to create at least one consumer session in association with the user during which to execute at least a portion of the at least one service, including transitioning through one or more of the service states of the at least one service according to the coordination model,
        a consumer instance manager configured to cause the at least one processor to create at least one instance of the at least one service within the at least one consumer session, the at least one instance being associated with the at least one service including representing each of the service states with the at least one distinct form that is requested, filled-in, and submitted in association with the user via the service consumer of the computing device, and
        a service coordinator configured to cause the at least one processor to coordinate and track each of the service states during delivery of the at least one service from the at least one service provider within the at least one consumer session and the at least one instance of the at least one service, the service coordinator configured to cause the at least one processor to track and advance a current state of each executing service to a next service state using the coordination model characterizing the at least one service in which each of the distinct forms are associated with corresponding ones of the service states of the at least one service and in which the transitions between each of the service states are executed based on the at least one distinct form exchanged with the service consumer during each service state.

2. The system of claim 1, wherein the service delivery manager is configured to cause the at least one processor to persist a current state of the coordination model within the at least one instance and the at least one consumer session, in response to a termination of the at least one consumer session by the user.

3. The system of claim 1, comprising a forms mediator configured to cause the at least one processor to format the forms based on a delivery channel associated with the service consumer, during the delivery.

4. The system of claim 1, wherein the at least one service includes a first service and a second service within a service group, the first service and the second service being asynchronously executing services in which the first service and the second service operate independently from each other but for the coordination provided by the coordination model, the system comprising a service group manager configured to cause the at least one processor to identify synchronization states within the coordination model, the synchronization states being points within the coordination model at which it is allowable for the service delivery manager to alter a group level attribute of the service group during the delivery.

5. The system of claim 4, wherein the group level attribute includes an authentication level associated with the service group and the user.

6. The system of claim 4, wherein the system includes a payment manager configured to execute payment collection for at least a portion of the delivery, and wherein the group level attribute includes the payment executed in association with a synchronization state of the synchronization states.

7. The system of claim 4, wherein the service group manager is configured to cause the at least one processor to define a synchronization point within the coordination model at which it is permissible to add or remove services from the service group.

8. The system of claim 1, wherein the transitions between the service states include discrete points during service execution where one or more interactions on the forms can proceed.

9. The system of claim 1, wherein the service regulator is configured to cause the at least one processor to associate the service states with corresponding form templates for instantiation thereof into the forms, the form templates being defined independent of specific user interface (UI) technologies.

10. A computer-implemented method including executing instructions stored on a computer-readable storage medium, comprising:
transforming a service interface of at least one service of at least one service provider into a generic description of service states and transitions between the service states to create a coordination model, the service states corresponding to distinct forms to be exchange with a user as part of an execution of the at least one service, the transitions representing action requests and responses on the at least one service;
interfacing with a service consumer of a computing device consuming the at least one service of the at least one service provider to thereby execute a delivery of the at least one service to the service consumer, the at least one service including the service states and the transitions modeled with the coordination model, each of the service states represented as at least one distinct form that is requested, filled-in, and submitted in association with the user via the service consumer of the computing device;
creating at least one consumer session in association with the user during which to execute at least a portion of the at least one service, including transitioning through one or more of the service states of the at least one service according to the coordination model;
creating at least one consumer session in association with the user during which to execute at least a portion of the at least one service, including transitioning through one or more of the service states of the at least one service according to the coordination model; and
coordinating and tracking each of the service states during delivery of the at least one service from the at least one service provider within the at least one consumer session and the at least one instance of the at least one service including tracking and advancing a current state of each executing service to a next service state using the coordination model characterizing the at least one service in which each of the distinct forms are associated with corresponding ones of the service states of the at least one service and in which the transitions between each of the service states are executed based on the at least one distinct form exchanged with the service consumer during each service state,
wherein the coordinating includes creating a form corresponding to a current state of the coordination model based on a generic template form in conjunction with each advancing service state of the coordination model.

11. The method of claim 10 wherein the coordinating comprises:
detecting a termination of the at least one consumer session; and
persisting a current state of the coordination model within the at least one instance and the at least one consumer session, in response to the termination.

12. The method of claim 11 wherein the coordinating comprises:
receiving a form request for the form associated with the current state of the coordination model;
obtaining the form template for the requested form; and
formatting the requested form based on a delivery channel associated with the service consumer, during the delivery.

13. The method of claim 10, wherein the coordination model is expressed in an eXtensible Markup Language (XML) file or a Unified Modeling Language (UML) diagram.

14. The method of claim 10, wherein the at least one service comprises a first service and a second service within a service group, the first service permitting anonymous interactions, the second service requiring password authentication, and wherein the coordinating the delivery includes identifying synchronization states within the coordination model, the synchronization states being points within the coordination model at which it is allowable to alter a group level attribute of the service group during the delivery.

15. The method of claim 14, wherein the group level attribute includes an authentication level associated with the service group and the user.

16. A computer program product, the computer program product being tangibly embodied on a non-transitory computer-readable storage medium and including executable code that, when executed, is configured to cause at least one processor of a data processing apparatus to:
 execute, by a service broker, brokered service delivery of at least one service of a service provider that provides the at least one service to a consumer computing device via the service broker, the service broker being an intermediary that provides a central point of access to the at least one service hosted by the service provider, including:
  register the at least one service within a service registry such that delivery and execution of the at least one service are provided through the service broker;
  transform a service interface of the at least one service into a generic description of service states and transitions between the service states to create a coordination model, the service states corresponding to distinct forms to be exchange with a user as part of an execution of the at least one service, the transitions representing action requests and responses on the at least one service;
  interface with a service consumer of the computing device consuming the at least one service of the at least one service provider to thereby execute the delivery of the at least one service to the service consumer, the at least one service including the service states and the transitions modeled with the coordination model, each of the service states represented as at least one distinct form that is requested, filled-in, and submitted in association with the user via the service consumer of the computing device;
  create at least one consumer session in association with the user during which to execute at least a portion of the at least one service, including transitioning through one or more of the service states of the at least one service according to the coordination model;
  create at least one instance of the at least one service within the at least one consumer session, the at least one instance being associated with the at least one service including representing each of the service states with the at least one distinct form that is requested, filled-in, and submitted in association with the user via the service consumer of the computing device; and
  coordinate and track each of the service states during delivery of the at least one service from the at least one service provider within the at least one consumer session and the at least one instance of the at least one service including track and advance a current state of each executing service to a next service state using the coordination model characterizing the at least one service in which each of the distinct forms are associated with corresponding ones of the service states of the at least one service and in which the transitions between each of the service states are executed based on the at least one distinct form exchanged with the service consumer during each service state, wherein the executable code to coordinate includes executable code to invoke a form corresponding to a current state of the coordination model based on a generic template form in conjunction with each advancing service state of the coordination model.

17. The computer program product of claim 16 wherein the executable code causes the at least one data processing apparatus to coordinate the delivery including:
 detecting a termination of the at least one consumer session; and
 persisting a current state of the coordination model within the at least one instance and the at least one consumer session, in response to the termination.

18. The computer program product of claim 16 wherein the executable code causes the at least one data processing apparatus to coordinate the delivery including:
 receiving a form request for the form associated with the current state of the coordination model;
 obtaining the form template for the requested form; and
 formatting the requested form based on a delivery channel associated with the service consumer, during the delivery.

19. The computer program product of claim 16, wherein the executable code includes executable code to:
 translate messages received from the service consumer for communication with specific services running on a remote backend system of the service provider that are not included as part of the brokered service delivery provided by the service broker.

20. The computer program product of claim 19, wherein the at least one service comprises a first service and a second service within a service group, the first and second services being asynchronously executing services in which the first service and the second service operate independently from each other but for the coordination provided by the coordination model, wherein the coordination model includes synchronization states at which it is allowable to alter a group level attribute of the service group during the delivery.

* * * * *